(12) United States Patent
Kaplita et al.

(10) Patent No.: US 12,069,993 B2
(45) Date of Patent: Aug. 27, 2024

(54) MULTI-PLANE CONFIGURABLE GROW SYSTEM FOR CONTROLLED ENVIRONMENT AGRICULTURE

(71) Applicant: SHAMROCK GREENS, INC., Templeton, CA (US)

(72) Inventors: Stanley C. Kaplita, Sammamish, WA (US); Peter Thaman-Bigsby, Paso Robles, CA (US); Jens Frederik Jaegerholm, Aarslev (DK)

(73) Assignee: SHAMROCK GREENS, INC., Templeton, CA (US)

( * ) Notice: Subject to any disclaimer, the term of this patent is extended or adjusted under 35 U.S.C. 154(b) by 139 days.

(21) Appl. No.: 17/729,309

(22) Filed: Apr. 26, 2022

(65) Prior Publication Data

US 2022/0304252 A1 Sep. 29, 2022

Related U.S. Application Data

(63) Continuation of application No. PCT/US2021/025304, filed on Apr. 1, 2021.
(Continued)

(51) Int. Cl.
*A01G 31/04* (2006.01)
*A01G 9/02* (2018.01)
*A01G 9/24* (2006.01)

(52) U.S. Cl.
CPC .......... *A01G 31/042* (2013.01); *A01G 9/023* (2013.01); *A01G 9/246* (2013.01)

(58) Field of Classification Search
CPC ........ A01G 31/00; A01G 31/04; A01G 31/06; A01G 31/042; A01G 9/023; A01G 9/246
See application file for complete search history.

(56) References Cited

U.S. PATENT DOCUMENTS 2,928,211 A 3/1960 Martin
2,952,096 A 9/1960 Hughes et al.
(Continued)

FOREIGN PATENT DOCUMENTS

CA 3095135 A1 * 10/2019 .......... A01C 23/005
JP 2019216685 A 12/2019
(Continued)

OTHER PUBLICATIONS

International Search Report and Written Opinion for International Application No. PCT/US2021/025304 dated Aug. 25, 2021, 16 pages.
(Continued)

*Primary Examiner* — Ebony E Evans
(74) *Attorney, Agent, or Firm* — Meunier Carlin & Curfman LLC

(57) ABSTRACT

A controlled environment agriculture system maximizes high quality yield, plant or organism density, and life cycle productivity. A combined structure contains automated conveyance and more than two vertically stacked planes of horizontal track that plants traverse throughout their life cycle. Nutritional support, controlled lighting, controlled climate and air flow are managed at each plane and coordinated across all planes as a system for optimized life cycle productivity. Plant or organism growth carriers are conveyed and connected to multiple planes with controlled elevators that enable continuous movement of plants throughout their lifecycle from seedling to harvest in a serpentine, carousel, or straight path configuration. Plants enjoy a variety of controlled environmental conditions including lighting, airflow, CO2, temperature and humidity configured to their organism type and optimized by life cycle stage. The ongoing movement provides an optimal environment for robust plant growth, eliminates the opportunity for pests to settle
(Continued)

and lay eggs, and enables the ability to course correct organisms to higher yields.

18 Claims, 14 Drawing Sheets

Related U.S. Application Data

(60) Provisional application No. 63/003,770, filed on Apr. 1, 2020.

(56) References Cited

U.S. PATENT DOCUMENTS

| | | | |
|---|---|---|---|
| 3,458,951 | A | 8/1969 | Martin |
| 4,068,405 | A | 1/1978 | Campbell et al. |
| 4,163,342 | A | 8/1979 | Fogg et al. |
| 4,178,716 | A | 12/1979 | Harper et al. |
| 5,493,808 | A | 2/1996 | Munday |
| 8,234,812 | B1 | 8/2012 | Colless et al. |
| 8,910,419 | B1 | 12/2014 | Oberst |
| 9,357,718 | B1 | 6/2016 | Lehman et al. |
| 10,080,332 | B1 | 9/2018 | Yi et al. |
| 10,598,366 | B1 | 3/2020 | Morris et al. |
| 11,399,471 | B2 * | 8/2022 | Aykroyd .............. A01G 9/1423 |
| 11,470,785 | B2 * | 10/2022 | Knowles ............. A01G 9/1423 |
| 11,559,015 | B2 | 1/2023 | Kivioja |
| 11,606,919 | B2 * | 3/2023 | Grohs ................... A01G 31/04 |
| 2015/0223402 | A1 | 8/2015 | Krijn et al. |
| 2016/0286736 | A1 | 10/2016 | Shimazu |
| 2017/0127629 | A1 | 5/2017 | Miyabe et al. |
| 2017/0146226 | A1 | 5/2017 | Storey et al. |
| 2017/0303478 | A1 | 10/2017 | Smith et al. |
| 2018/0014471 | A1 | 1/2018 | Jensen et al. |
| 2018/0017244 | A1 | 1/2018 | Smith et al. |
| 2018/0153113 | A1 | 6/2018 | Storey et al. |
| 2018/0213734 | A1 | 8/2018 | Smith et al. |
| 2019/0037792 | A1 * | 2/2019 | Leo ....................... A61K 36/185 |
| 2019/0059241 | A1 | 2/2019 | Bogner et al. |
| 2019/0230876 | A1 * | 8/2019 | Lysaa ................... A01G 31/042 |
| 2019/0269079 | A1 | 9/2019 | Klein et al. |
| 2019/0269080 | A1 | 9/2019 | Whitworth et al. |
| 2019/0269083 | A1 | 9/2019 | Klein et al. |
| 2019/0297787 | A1 | 10/2019 | Klein et al. |
| 2019/0335676 | A1 | 11/2019 | Solomon |
| 2019/0387677 | A1 | 12/2019 | Klein et al. |
| 2020/0037525 | A1 | 2/2020 | Klein et al. |
| 2020/0349476 | A1 | 11/2020 | Diamos et al. |
| 2020/0352122 | A1 | 11/2020 | Matera et al. |
| 2020/0355330 | A1 | 11/2020 | Morris et al. |
| 2020/0356078 | A1 | 11/2020 | Edelkhani et al. |
| 2020/0367455 | A1 | 11/2020 | Vesty |
| 2020/0383287 | A1 | 12/2020 | Klein et al. |
| 2021/0000022 | A1 | 1/2021 | Coffin et al. |
| 2021/0137037 | A1 * | 5/2021 | Tyink .................... A01G 31/02 |
| 2021/0204499 | A1 | 7/2021 | Fujisawa |
| 2022/0240458 | A1 | 8/2022 | Breza |
| 2022/0256790 | A1 * | 8/2022 | Kaplita ................. A01G 9/246 |

FOREIGN PATENT DOCUMENTS

| | | | |
|---|---|---|---|
| KR | 20160017556 A * | 2/2016 | ............. A01G 31/06 |
| WO | 2008129118 A1 | 10/2008 | |
| WO | WO-2009119778 A1 * | 10/2009 | ............. A01G 31/06 |
| WO | 2013147603 A1 | 10/2013 | |
| WO | 2015002529 A2 | 1/2015 | |
| WO | 2019039625 A1 | 8/2015 | |
| WO | 2017012644 A1 | 1/2017 | |
| WO | 2017024353 A1 | 2/2017 | |
| WO | 2017037332 A1 | 3/2017 | |
| WO | 2017216419 A1 | 12/2017 | |
| WO | 2018130744 A1 | 7/2018 | |
| WO | 2019030428 A1 | 2/2019 | |
| WO | 2019056057 A1 | 3/2019 | |
| WO | 2019162559 A1 | 8/2019 | |
| WO | 2019183244 A2 | 9/2019 | |
| WO | 2020076735 A1 | 4/2020 | |
| WO | 2020092503 A1 | 5/2020 | |
| WO | 2020092506 A1 | 5/2020 | |
| WO | 2020132634 A1 | 6/2020 | |
| WO | 2020226980 A1 | 11/2020 | |
| WO | 2020227191 A1 | 11/2020 | |
| WO | 2020231705 A1 | 11/2020 | |
| WO | 2020231706 A1 | 11/2020 | |
| WO | WO-2021055444 A1 * | 3/2021 | ........... A01G 31/045 |

OTHER PUBLICATIONS

International Preliminary Report on Patentability for International Application No. PCT/US2021/025304 dated Oct. 13, 2022, 13 pages.

Office Action issued for U.S. Appl. No. 17/729,313, dated Jan. 30, 2024.

* cited by examiner

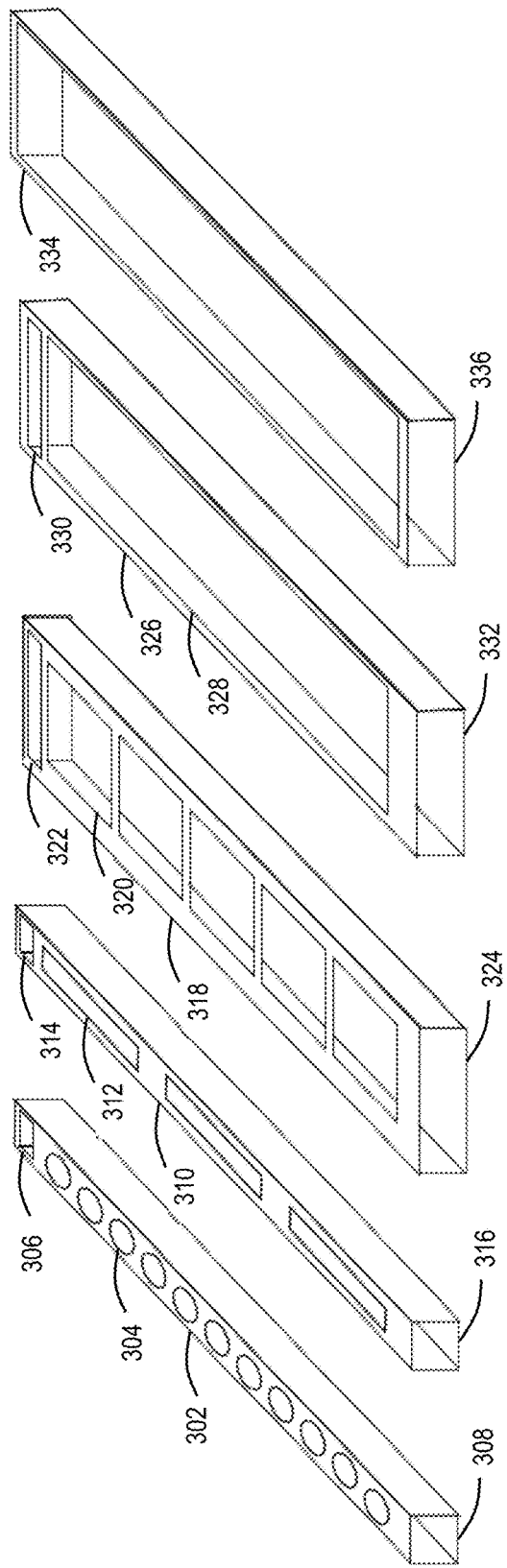

MULTI-PLANE CONFIGURABLE GROW SYSTEM FOR CONTROLLED ENVIRONMENT AGRICULTURE

CROSS-REFERENCE TO RELATED APPLICATIONS

This application is a continuation application of International Application No. PCT/US2021/025304 filed on Apr. 1, 2021, which claims priority to U.S. Provisional Application Serial No. 63/003,770 filed Apr. 1, 2020, the disclosures of which are expressly incorporated herein by reference.

TECHNICAL FIELD

Various embodiments concern controlled environment agriculture utilizing a vertically stacked multi-plane system.

BACKGROUND

Controlled Environment Agriculture has been worked on for decades with more emphasis recently due to climate change, soil erosion, food contamination, and population growth. Depending on a farmer's or entrepreneur's final product or goal, a variety of hydroponic, aquaponic, aeroponic, ebb and flow systems, open bed, and device solutions have been developed to produce flowers, fruits, vegetables, cannabis, etc., for greenhouse, grow house, and indoor farming.

In operations methods of production there are four: The Job Method, the Batch Method, the Mass Production Method and the continuous production or Flow Method.

With the Job Method, the complete task is handled by a single worker or group of workers. Jobs can be small-scale/low technology as well as complex/high technology.

Batch methods require that the work for any task is divided into parts or operations. Each operation is completed through the whole batch before the next operation is performed.

Mass Production sometimes utilizing flow production, cuts out the problem of downtime associated with batch methods typically having excess component inventory at various stages to ensure minimal downtime. This method is characterized with high automation, quantities built to economic stocking levels, and cost-effective when producing large quantities of the same product. This method makes it difficult to utilize as a new business or for those operating in niche markets.

Flow methods are like batch methods, except that the problem of rest/idle production/batch queuing is eliminated. Flow has been defined as a "method of production organization where the task is worked on continuously or where the processing of material is steady and predictable." The rate of flow production is synchronized with the rate of customer demand so that inventory is minimized.

SUMMARY

Traditionally controlled environment agriculture has been designed using batch methods to reduce costs and allow for yield loss at various life cycle stages (seeding, germination, propagation, production, harvest, and processing) and with equipment and people moving to where the plants or organisms are stationed or where people and material handling must move themselves and plants to perform a task or position for a life cycle stage.

Batch methods for agriculture are beneficial in addressing variations caused by raw materials, environmental conditions, fertigation conditions, etc., allowing the grower to plant more in the beginning, rearrange the order of batches, adjust labor or automation to batches to meet final production goals. However, there is a high probability of poor workflow, particularly if the batches are not of the optimal size or if there is a significant difference in productivity by each operation in the process. Batch methods often result in the buildup of significant "work in progress" or excess plug or plant inventory that is perishable and contributes to waste.

Most systems require manual intervention, transplanting operations or miscellaneous automated operations in various configurations similar to the managing of a multitude of pallets in racks and locations in a warehouse. Multiple levels of large trays of plant plugs, growing media, aeroponics (sprayed irrigation) have been used requiring excessive manual activity, robotics, excessive material handling equipment and excessive software development to transport and keep track of locations, life cycle status, environmental conditions, lighting conditions, irrigation cycles, their schedules etc.

The multi-plane Hydroponics grow system, starts with raw material input and ends with harvest packaging in a just-in-time, continuous flow. The connected flow design principle of the system minimizes the need for labor other than the oversight of raw material input and manual or automated harvest packaging. People arrive and work at one station and the plants traverse through a predetermined path with optimal conditions throughout their lifecycle. Furthermore, leveraging the Toyota Way concepts, only what is needed, when it is needed, and in the amount needed, is procured and produced.

The following were integrated into aspects of the multi-plane system. Some of which are known in the industry:

Single plane Nutrient Film Technique (NFT) with preset plant maturity spacing has been used in greenhouses for over two decades. Also referred to as a Mobile Gulley System and various trade names. NFT uses plastic carriers also known as gutters, channels or gulley's. There are four sides to each carrier with smooth vertical sides, a bottom with tracking ribs and a top with or without punched round holes in which mineral wool, or other growing media or matching pots are placed. In the case of pots, the bottom of the pot has openings to allow nutrient to be absorbed into the media and feed the seed and roots. In addition to round holes for matching pots, the multi-plane hydroponics grow system, permit additional carrier configurations that allow for a variety of growing organisms, sub-carriers and media. The carrier itself is designed to receive nutrient at one end and run down the carrier as it sits on a slightly sloped frame to feed all potted plants or growing organisms.

Standard NFT carriers index at various distances increasing distance between carriers as plants mature. The carrier index distance is customized according to cultivar or growing organism and whether the growth chamber for this cultivar or growing organism is programmed for single plane or connected multi-plane life cycle flow in a serpentine pattern. The multi-plane hydroponics grow system allows variation in height between planes, increasing height as cultivars or growing organisms mature. This unique design permits unencumbered organisms to grow in volume while optimizing total grow density whereas standard indoor vertical farms are constructed with uniform height between grow platform locations.

A two-plane nutrient film system for greenhouse or multi-tiered ebb and flow or aeroponic systems have been public for years as they offer a space saving or controlled environment approach to germination, propagation and grow out production. The bottom layer is dark for intended germination or supplemented with light for propagation and the top layer exposed to sunlight for grow out production.

Additionally, other concepts and methodologies such as the Toyota Way management concepts; Lean production, Kan-ban flow management can be incorporated into agricultural techniques.

A first aspect of the disclosure provides a multi-layer grow system comprising a first carrier path, a second carrier path, a third carrier path, a first elevator, and a second elevator. The first carrier path comprises a first conveyor configured to sequentially receive and convey a plurality of crop carriers along a length of the multi-layer grow system from a first end to a second end of the multi-layer grow system.

The second carrier path comprises a second conveyor configured to sequentially receive and convey the plurality of crop carriers along the length of the multi-layer grow system from the second end to the first end of the multi-layer grow system. The second carrier path is vertically displaced along a height at a next highest layer of the multi-layer grow system from the first carrier path.

The first elevator is positioned at the second end of the multi-layer grow system and configured to sequentially receive the plurality of crop carriers from the first carrier path, vertically lift, and deliver each of the plurality of crop carriers to the second carrier path.

The third carrier path comprising a third conveyor configured to sequentially receive and convey the plurality of crop carriers along the length of the multi-layer grow system from the first end to the second end of the multi-layer grow system. The third carrier path is vertically displaced along a height at a next highest layer of the multi-layer grow system from the second carrier path.

The second elevator positioned at the first end of the multi-layer grow system and configured to sequentially receive the plurality of crop carriers from the second carrier path, vertically lift, and deliver the carrier to the third carrier path.

In some implementations of the first aspect of the disclosure, the multi-layer grow system further comprises a fourth carrier path configured to sequentially receive and convey the plurality of crop carriers along the length of the multi-layer grow system from the second end to the first end of the multi-layer grow system. The fourth carrier path is vertically displaced along a height at a next highest layer of the multi-layer grow system from the third carrier path. The first elevator is configured to sequentially receive the plurality of crop carriers from the third carrier path, vertically lift, and deliver each of the plurality of crop carriers to the fourth carrier path. The second elevator is configured to sequentially receive the plurality of crop carriers from the fourth carrier path, vertically lower, and deliver each of the plurality of crop carriers to the first carrier path.

In some implementations of the first aspect of the disclosure, a spacing between sequential ones of the plurality of crop carriers is the same along the first, second, and third carrier paths.

In some implementations of the first aspect of the disclosure, a spacing between sequential ones of the plurality of crop carriers is different on different ones of the first, second, and third carrier paths.

In some implementations of the first aspect of the disclosure, the spacing between sequential ones of the plurality of crop carriers increases at each successive layer of the multi-layer grow system.

In some implementations of the first aspect of the disclosure, the spacing between sequential ones of the plurality of crop carriers is different at different cells along a respective one or more of the first, second, and third carrier paths.

In some implementations of the first aspect of the disclosure, the second conveyor is configured to convey the plurality of crop carriers along the length of the multi-layer grow system from the second end to the first end of the multi-layer grow system at a faster rate than the first conveyor is configured to convey the plurality of crop carriers along the length of the multi-layer grow system from the first end to the second end.

In some implementations of the first aspect of the disclosure, the third conveyor is configured to convey the plurality of crop carriers along the length of the multi-layer grow system from the first end to the second end of the multi-layer grow system at a faster rate than the second conveyor is configured to convey the plurality of crop carriers along the length of the multi-layer grow system from the second end to the first end.

In some implementations of the first aspect of the disclosure, the multi-layer grow system further comprises air supply ducts and air return ducts arranged to promote vertical air flow in the spacing between sequential ones of the plurality of crop carriers.

In some implementations of the first aspect of the disclosure, the air supply ducts comprise a main air supply duct, a plurality of supply plenums, and a respective plurality of layer supply ducts. The main air supply duct that extends along the length of the multi-layer grow system. The plurality of supply plenums in fluid communication with the main air supply duct, the plurality of supply plenums extending along a height of the multi-layer grow system at a first set of predetermined locations along the length of the multi-layer grow system. Each of the plurality of supply plenums in fluid communication with the respective plurality of layer supply ducts. Each of the plurality of supply ducts extending along a width of the multi-layer grow system at a different layer of the multi-layer grow system.

In some implementations of the first aspect of the disclosure, each of the plurality of supply ducts comprises a plurality of air supply holes.

In some implementations of the first aspect of the disclosure, one or more of the plurality of air supply holes are on a top half of one or more of the plurality of supply ducts.

In some implementations of the first aspect of the disclosure, the air return ducts comprise a main air return duct, a plurality of lateral air return ducts, and a plurality of air return registers. The plurality of lateral air return ducts in fluid communication with the main air return duct. The plurality of lateral air return ducts extending along the width at a second set of predetermine locations along the length of the multi-layer grow system. Each of the plurality of lateral air return ducts comprises a plurality of air return registers spaced apart at predetermined distances across the width of the multi-layer grow system.

In some implementations of the first aspect of the disclosure, the second set of predetermined locations along the length of the multi-layer grow system are the same as the first set of predetermined locations along the length of the multi-layer grow system.

In some implementations of the first aspect of the disclosure, the multi-layer grow system further comprises an air conditioner configured to maintain a temperature, humidity, and carbon dioxide levels of air recirculated within the air supply ducts and air return ducts.

In some implementations of the first aspect of the disclosure, the air conditioner is configured to inject carbon dioxide to maintain an amount of carbon dioxide within air supplied to the air supply ducts between 400-5000 parts per million.

In some implementations of the first aspect of the disclosure, the air conditioner is configured to inject carbon dioxide to maintain an amount of carbon dioxide within air supplied to the air supply ducts between 1000-3000 parts per million.

In some implementations of the first aspect of the disclosure, a width of the multi-layer grow system corresponds to a width of each of the plurality of crop carriers.

In some implementations of the first aspect of the disclosure, the width of the multi-layer grow system is greater than 10 feet, greater than or equal to 20 feet, or less than or equal to sixty feet.

In some implementations of the first aspect of the disclosure, the length of the multi-layer grow system is greater than 20 feet, greater than or equal to 50 feet, or less than or equal to 600 feet.

In some implementations of the first aspect of the disclosure, each of the first, second, and third carrier paths of the multi-layer grow system is sloped across the width of the multi-layer grow system.

In some implementations of the first aspect of the disclosure, the slope is less than 5 degrees.

A second aspect of the disclosure provides a multi-layer grow system. The multi-layer grow system comprises a first carrier path comprising a first conveyor configured to sequentially receive and convey a plurality of crop carriers along a length of the multi-layer grow system from a first end to a second end of the multi-layer grow system. The multi-layer grow system comprises a second carrier path comprising a second conveyor configured to sequentially receive and convey the plurality of crop carriers along the length of the multi-layer grow system from the second end to the first end of the multi-layer grow system. The second carrier path is vertically displaced along a height of the multi-layer grow system from the first carrier path, and wherein a spacing between the plurality of crop carriers along the second carrier path is greater than a spacing between the plurality of crop carriers along the first carrier path. The multi-layer grow system comprises a first elevator positioned at the second end of the multi-layer grow system and configured to sequentially receive the plurality of crop carriers from the first carrier path and vertically lift and deliver the carrier to the second carrier path. The multi-layer grow system comprises air supply ducts and air return ducts arranged to promote vertical air flow in spacing between sequential ones of the plurality of crop carriers.

A third aspect of the disclosure provides a multi-layer grow system. The multi-layer grow system comprises a first carrier path comprising a conveyor configured to sequentially receive and convey a plurality of crop carriers along a length of the multi-layer grow system from a first end to a second end of the multi-layer grow system. The multi-layer grow system comprises a second carrier path comprising a second conveyor configured to sequentially receive and convey a second plurality of crop carriers along the length of the multi-layer grow system from the first end to the second end of the multi-layer grow system. The second carrier path is vertically displaced along a height of the multi-layer grow system from the first carrier path. The multi-layer grow system comprises a first elevator positioned at the first end of the multi-layer grow system and configured to sequentially receive the second plurality of crop carriers, vertically lift, and deliver each of the second plurality of crop carriers to the second carrier path. The multi-layer grow system comprises a plurality of sets of layer air supply ducts, each set of layer air supply ducts is positioned at one of a first plurality of predetermined locations along the length of the multi-layer grow system. Each layer air supply duct of a given set of layer air supply ducts extends along a width of the multi-layer grow system at a different layer of the multi-layer grow system. The multi-layer grow system comprises a plurality of sets of layer air return ducts, each set of layer air return ducts is positioned at one of a second plurality of predetermined locations along the length of the multi-layer grow system. The second plurality of predetermined locations is interleaved with the first plurality of predetermined locations. Each layer air return duct of a given set of layer air return ducts extends along the width of the multi-layer grow system at a different layer of the multi-layer grow system.

In some implementations of the third aspect of the disclosure, each layer air supply duct comprises a plurality of air supply holes, and wherein each layer air return duct comprises a plurality of air return registers spaced apart at predetermined distances across the width of the multi-layer grow system.

In some implementations of the third aspect of the disclosure, the plurality of sets of layer air supply ducts and the plurality of sets of layer air return ducts are configured to laterally distribute air across a length of each layer of the multi-layer grow system.

In some implementations of the third aspect of the disclosure, the multi-layer grow system further comprises a third carrier path comprising a conveyor configured to sequentially receive and convey the plurality of crop carriers along a length of the multi-layer grow system from the second end to the first end of the multi-layer grow system. The third carrier path is vertically displaced along a height at a next highest layer of the multi-layer grow system from the first carrier path. The multi-layer grow system further comprises a second elevator positioned at the second end of the multi-layer grow system and configured to sequentially receive the plurality of crop carriers from the first carrier path, vertically lift, and deliver the carrier to the third carrier path. The first elevator is configured to sequentially receive the plurality of crop carriers from the third carrier path, vertically lower, and deliver the carrier to the first carrier path.

In some implementations of the third aspect of the disclosure, the multi-layer grow system further comprises a third carrier path comprising a conveyor configured to sequentially receive and convey the plurality of crop carriers along a length of the multi-layer grow system from the second end to the first end of the multi-layer grow system. The third carrier path is vertically displaced along a height at a next highest layer of the multi-layer grow system from the first carrier path. The multi-layer grow system further comprises a second elevator positioned at the second end of the multi-layer grow system and configured to sequentially receive the plurality of crop carriers from the first carrier path, vertically lift, and deliver the carrier to the third carrier path. The plurality of crop carriers and the second plurality of crop carriers are the same. The second carrier path is vertically displaced along a height at a next highest layer of the multi-layer grow system from the third carrier path. The first elevator is configured to sequentially receive the plurality of crop carriers, vertically lift, and deliver each of the plurality of crop carriers from the third carrier path to the second carrier path.

In some implementations of the third aspect of the disclosure, the multi-layer grow system further comprises a fourth carrier path comprising a conveyor configured to sequentially receive and convey the plurality of crop carriers along a length of the multi-layer grow system from the second end to the first end of the multi-layer grow system. The fourth carrier path is vertically displaced along a height at a next highest layer of the multi-layer grow system from the second carrier path. The first elevator is configured to sequentially receive the plurality of crop carriers, vertically lower, and deliver each of the plurality of crop carriers from the fourth carrier path to the first carrier path.

A fourth aspect of the disclosure provides a configurable continuous flow multi-layer grow system. The system comprises a multi-layer germination chamber configured to receive a plurality of crop carriers with crops planted therein. Each layer of the multi-layer germination chamber is configured to convey a subset of the plurality of crop carriers from a first end to a second end of the germination chamber to germinate the crops planted therein. The system comprises a plurality of multi-layer growing lines. Each of the plurality of growing lines is configured to receive a subset of a second plurality of crop carriers with germinated crops from the germination chamber and convey the subset of the second plurality of crop carriers through a respective multi-layer growing line according to a growing path to grow the germinated crops to maturity. The system comprises a wash station configured to receive and wash each of the second plurality of crop carriers subsequent to traversal of the growing path.

In some implementations of the fourth aspect of the disclosure, a first layer of the multi-layer germination chamber has different growing conditions than a second layer of the multi-layer germination chamber.

In some implementations of the fourth aspect of the disclosure, the growing conditions on each layer of the multi-layer germination chamber are selected from the group of growing conditions consisting of: conveyance speed, humidity, and temperature.

In some implementations of the fourth aspect of the disclosure, each of the multi-layer growing lines comprise a crop carrier conveyor on each layer of a respective multi-layer growing line and a pair of elevators with one of the pair of elevators at each end of the respective multi-layer growing line.

In some implementations of the fourth aspect of the disclosure, the growing path on a first of the plurality of multi-layer growing lines is different than the growing path on a second of the plurality of multi-layer growing lines.

In some implementations of the fourth aspect of the disclosure, the system further comprises a controller configured to route each crop carrier in the subset of the second plurality of crop carriers with germinated crops from the germination chamber along an input conveyor to a corresponding one of the plurality of multi-layer grow lines.

In some implementations of the fourth aspect of the disclosure, the second plurality of crop carriers include a plurality of types of crop carriers, wherein each of the plurality of growing lines is configured to receive one of the plurality of types of crop carriers.

In some implementations of the fourth aspect of the disclosure, one or more of the plurality of types of crop carriers is selected from the group consisting of: a round opening carrier, a seed strip carrier, a quadrilateral tray carrier, a trough tray carrier, and an open bed carrier.

In some implementations of the fourth aspect of the disclosure, the multi-layer germination chamber comprises a pair of elevators with one of the pair of elevators at each end of the multi-layer germination chamber.

In some implementations of the fourth aspect of the disclosure, the plurality of crop carriers is the same as the second plurality of crop carriers.

In some implementations of the fourth aspect of the disclosure, the system further comprises an input conveyor extending along the multi-layer germination chamber and each of the plurality of multi-layer growing lines, wherein the input conveyor is configured to sequentially convey each of the plurality of crop carriers from the multi-layer germination chamber to one of the plurality of multi-layer growing lines.

In some implementations of the fourth aspect of the disclosure, the system further comprises an output conveyor extending along each of the plurality of multi-layer growing lines, wherein the output conveyor is configured to sequentially convey each of the plurality of crop carriers to the wash station.

In some implementations of the fourth aspect of the disclosure, the system further comprises a planting station adapted to sequentially receive the plurality of crop carriers from the wash station and convey the plurality of crop carriers with crops planted therein to the multi-layer germination chamber.

In some implementations of the fourth aspect of the disclosure, the planting station is an automatic planting station configured to sequentially insert growing medium and starter crops to germinate into each of the plurality of crop carriers.

In some implementations of the fourth aspect of the disclosure, the starter crops are selected from a group consisting of: seeds, spores, fungi, cuttings, and tubers.

In some implementations of the fourth aspect of the disclosure, the plurality of crop carriers are different than the second plurality of crop carriers.

In some implementations of the fourth aspect of the disclosure, the system further comprises a transplanting station configured to transplant crops from the plurality of crop carriers to the second plurality of crop carriers.

In some implementations of the fourth aspect of the disclosure, the plurality of crop carriers are germination trays, and a crop density in the germination trays is greater than a crop density in the second plurality of carriers.

In some implementations of the fourth aspect of the disclosure, the transplanting station is configured to receive the second plurality of crop carriers from the wash station.

In some implementations of the fourth aspect of the disclosure, the transplanting station is configured to receive the germination trays from the multi-layer germination chamber.

In some implementations of the fourth aspect of the disclosure, the system further comprises a second wash station configured to receive and wash each of the germination trays from the transplanting station.

In some implementations of the fourth aspect of the disclosure, the system further comprises a planting station adapted to sequentially receive the germination trays from the second wash station and convey the plurality of crop carriers with crops planted therein to the multi-layer germination chamber.

BRIEF DESCRIPTION OF THE DRAWINGS

FIG. 3 shows a plurality of carriers suitable for use with the multi-layer hydroponics grow systems, according to various aspects of the disclosure.

FIG. 4C shows exemplary configurations of multi-layer hydroponics grow systems for different crops, according to various aspects of the disclosure.

DETAILED DESCRIPTION

Figure 1A:
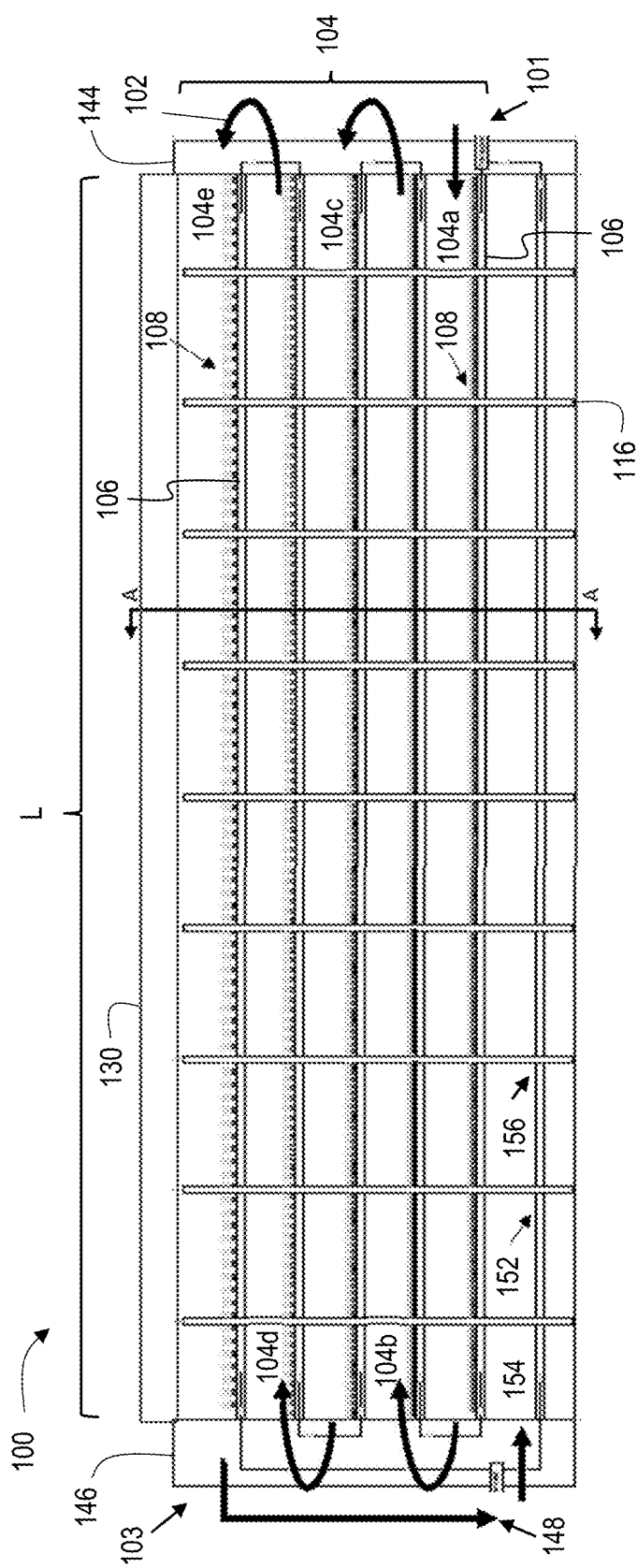
FIG. 1A is a side view of a multi-layer hydroponics grow system with vertical air flows, according to various aspects of this disclosure.

The multi-plane hydroponic grow system disclosed herein produces leafy greens, herbs, certain vegetables, and organisms employing a profitable and sustainable hydroponic solution. The multi-layer hydroponics grow system is adapted to transport nutrient film technique carriers on rectangular planes, layers, or levels with the width exceeding 05 meters and exceeding two planes or layers in a vertical stack. Each plane is constructed with a plurality of overhead grow lights, climate control, and sensors, as described in more detail below. In the case of a greenhouse application, a top plane may be left without grow lights. The multi-layer hydroponics grow system may have rectangular planes between 0.5 to 20 meters in width, 10 to 200 meters in length, and 2 to 10 meters in height, maximizing organism production density.

The growth carriers may be a plurality of consistent lengths, holding a plurality of plants, sub-carriers, or other organisms. Each plane through which the carrier indexes may be a plurality of consistent distances. The design of the climate control, sensors, and planes accommodates a plurality of cultivars and organisms, cultivar & organism lifecycles and cultivar and organism environments to maximize production flexibility, productivity, and quality within a controlled environment. The modular design enables stacking and connecting multiple vertical planes of large rectangular arrays to achieve exceedingly high density and productivity.

By taking plant health or organism measurements at each plane, sensors will signal later stages to increase or decrease airflow, temperature, speed, and/or nutrition recipe allowing growers and control algorithms to course correct and steer plants to a hearty tasty harvest.

In the case of cultivars, in some cases growers will crowd plants to achieve greater plant density within a given area or volume. The multi-plane hydroponic grow system allows more volumetric space for each plant as it grows both by utilizing NFT indexing methods that move the carriers apart and the increase in height between planes as cultivars progress through their lifecycle to provide high plant or organism density. By automatically connecting exceptionally reliable planes of moving carriers at each end to move forward and upward and by designing a large rectangular array, there is no requirement for material handling equipment and there is less area needed for access, tray or raft framing, material handling equipment and human access. The multi-plane hydroponic flow patterns gives plants the ability to grow expansively maximizing leaf incident area for photon reception while increasing density with fast moving carriers through a series of planes in a vertical configuration.

By starting with Controlled Environment Agriculture (CEA) using optimum grow lights and NFT with demonstrated evidence of high-speed growth, life cycle productivity is improved from a production standpoint with climate control and airflow. The structure/system designs in airflow and humidity control across each plane to ensure each plant remains within its optimal growing climate zone to facilitate rapid life cycle productivity.

From a customer's perspective (Grocer) the system enables product mix changes in short periods using small carrier numbers, known cultivar or organism life cycles and short but continuous plant/organism batches within a continuous flow system to meet changing consumer demands. By mathematically balancing germination, production and harvesting with known plant and organism growth rates and tray and carrier size, a variety of like cultivars/organisms can share the structure. Multiple structures in parallel operating at a variety of cycles enable a broader range of cultivars/organisms to be produced in a constantly variable quantity from a relatively small facility.

Figure 1B:
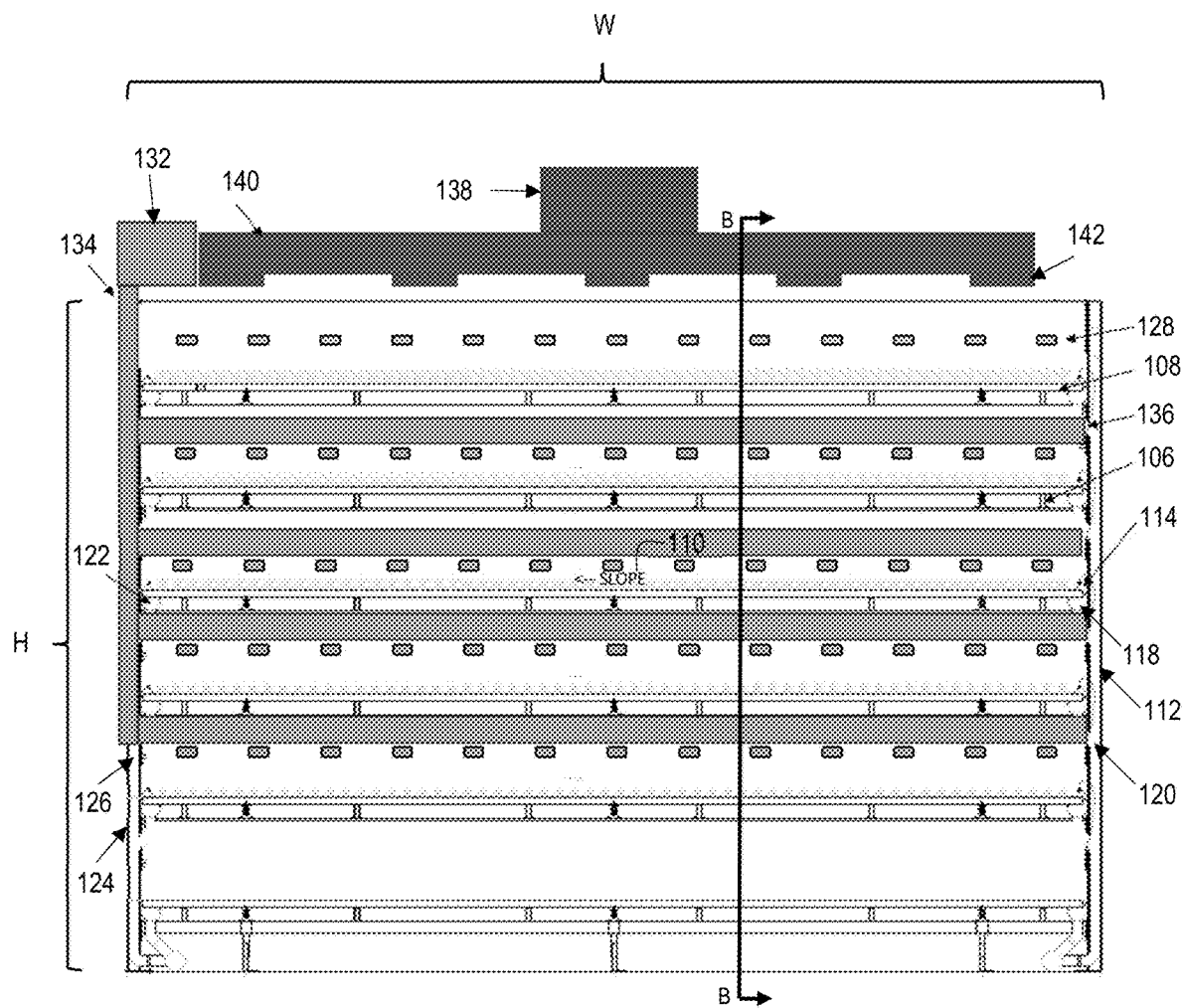
FIG. 1B is a cross-sectional view across a width of the multi-layer hydroponics grow system at the line A-A of FIG. 1A, according to various aspects of this disclosure.
Figure 1C:
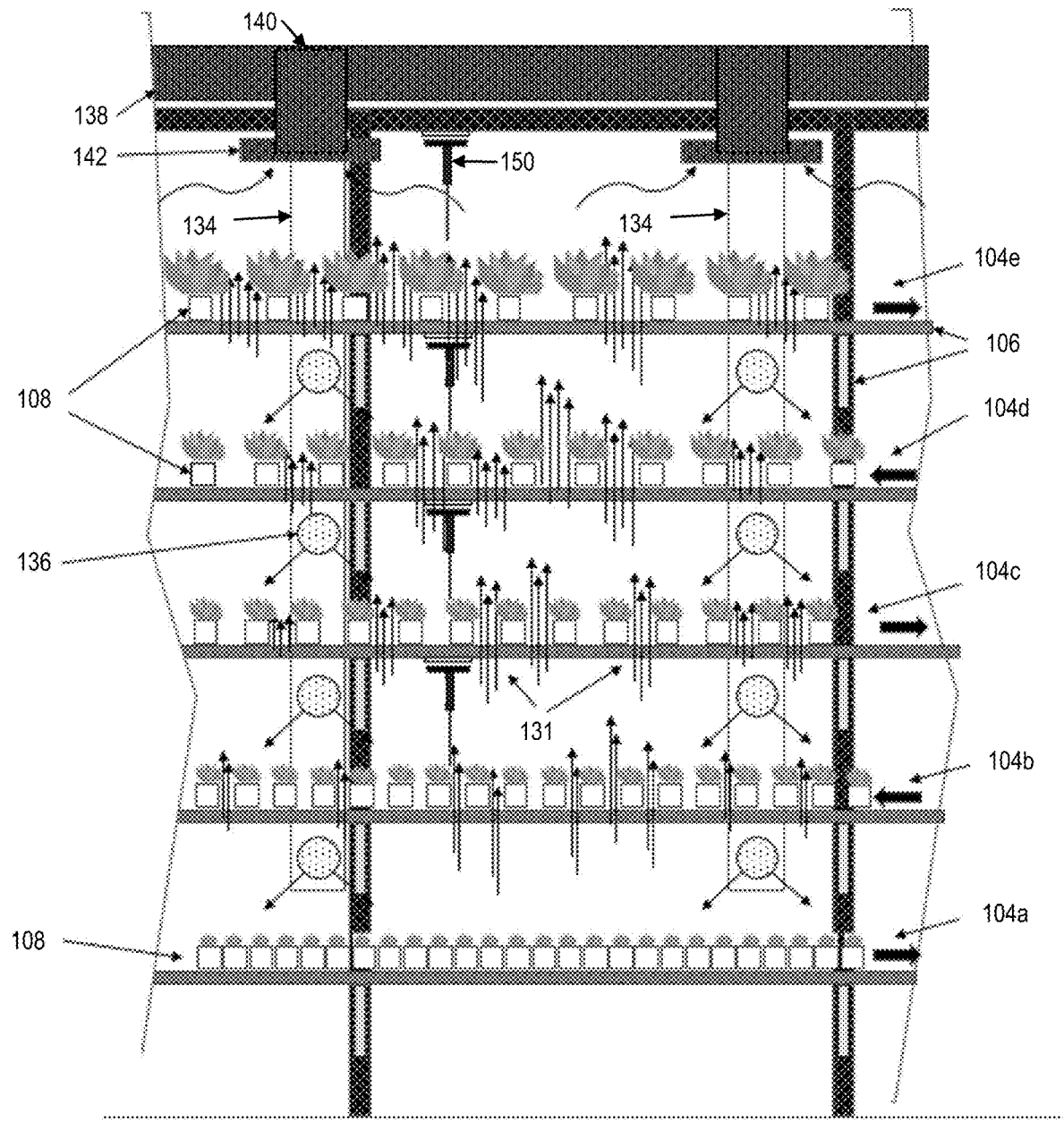
FIG. 1C is a partial cross-sectional view across a length of the multi-layer hydroponics grow system with vertical air flows at the line B-B of FIG. 1B, according to various aspects of the disclosure.

FIG. 1A is a side view of a multi-plane or multi-layer hydroponics grow system 100 with vertical air flows. FIG. 1B is a cross-sectional view across a width W of the multi-layer hydroponics grow system 100 at the line A-A of FIG. 1A. FIG. 1C is a partial cross-sectional view along a length L of the multi-layer hydroponics grow system 100 at the line B-B of FIG. 1B. Like numerals reference like parts across each of FIGS. 1A-1C. The examples shown in FIGS. 1A-1C use a serpentine growth path 102. In other examples, other growth paths described herein may be used with the multi-layer hydroponics grow system 100, such as a straight growth path, a carousel growth path, or a serpentine carousel growth path.

While the examples provided herein reference the multi-layer hydroponics grow system 100, the system may alternatively be referred to as a multi-layer grow system 100. In various examples, no fertigation fluid may be supplied to the multi-layer grow system 100, but other mechanisms for growth may be controlled, such as humidity, as described in more detail below. Therefore, references to hydroponics throughout this disclosure are not intended to be limiting, but are provided as an example of one type of growth mechanism.

The multi-layer hydroponics grow system 100 comprises a plurality of carrier growth paths 104 with open sides. The plurality of carrier growth paths 104 are interchangeably referred to as planes or layers of the multi-layer hydroponics grow system 100. In the example shown, there are five carrier growth paths 104, though more or fewer carrier growth paths 104 may be used. In various implementations, an odd number of carrier growth paths 104 are used for the multi-layer hydroponics grow system 100 with a serpentine growth path 102. For example, the multi-layer hydroponics grow system 100 may have 3, 5, 7, 9, 11, or more layers as desired. Providing an odd number of layers for the serpentine growth path 102 allows for entry of crops on a first end 101 and exit of the crops from an opposite end 103, also referred to as a second end 103, of the multi-layer hydroponics grow system 100 to allow for parallel processing of harvesting and new crop entry. In various implementations, an even number of carrier growth paths 104 are used for the multi-layer hydroponics grow system 100.

Each of the carrier growth paths 104 comprises a conveyor 106 configured to sequentially receive and convey a plurality of crop carriers 108 along the length L of the multi-layer hydroponics grow system 100. The crop carriers 108 may carry any suitable of crop, such as plants, fungi, algae, fruits, proteins, herbs, medicinal organisms, microgreens, etc. The conveyor 106 may be an indexing conveyor configured to transport the crop carriers 108 to predetermined index locations along the length L of the multi-layer hydroponics grow system 100. For example, the conveyor 106 may be an indexing conveyor, gravity fed conveyor with stop gates, powered conveyor, a push pull conveyor or any other type of conveyor adapted to move the crop carriers 108 along the carrier growth paths. Alternatively or additionally, the conveyor comprises one or more gates for stopping the crop carriers 108 at the predetermined index locations. Each of the predetermined index locations along the length L of the multi-layer hydroponics grow system 100 is separated by a distance greater than or equal to a depth of the crop carrier 108. That is, the conveyor 106 indexes the crop carriers 108 along the length of the multi-layer hydroponics grow system 100 in increments of at least a depth of the crop carrier 108.

The conveyor 106 may extend along the entire length L of the multi-layer hydroponics grow system 100 or a portion thereof. In some implementations, the conveyor 106 may extend along a portion of the length L of the multi-layer hydroponics grow system 100 and one or more additional conveyors (not shown) may extend along other portions of the length L of the multi-layer hydroponics grow system 100. Each of the additional conveyors may extend along a different growth cell of a given carrier growth path 104, described in more detail below. Each growth cell of a given carrier growth path 104 may have different growing conditions. For example, each growth cell may have a difference in one or more of lighting intensity, lighting duration or timing, humidity, carbon dioxide concentration, conveyance speed of the conveyor 106, nutrient levels, etc. Different ones of the plurality of carrier growth paths 104 may have different numbers of conveyors 106.

In various implementations, each of the plurality of crop carriers 108 is a mobile Nutrient Film Technique (NFT) carrier that is structurally supported on each of the carrier growth paths 104 on a slope 110. The slope 110 is less than 5 degrees, and in some implementations about 1 degree. As used herein, "about" means within 25% of a given measurement. For example, about 1 degree means between 0.75-1.25 degrees. Nutrition is delivered through a receiving port at one end of the crop carriers 108 and an irrigation/nutrient exit port at the downward slope of the carriers 108. Each of the crop carriers 108 span a width W of the multi-layer hydroponics grow system 100. The crop carriers 108 are described in more detail below with reference to FIG. 3.

On a first side 112 of the multi-layer hydroponics grow system 100 on each of the carrier growth paths 104, a fertigation supply tube 114 is positioned at one or more of the predetermined index locations along the length L of the multi-layer hydroponics grow system 100 for supplying a fertigation fluid stream to the crop carriers 108. In some implementations, a fertigation supply tube 114 is positioned at each of a plurality of vertical supports 116 of the multi-layer hydroponics grow system 100. In some implementations, a fertigation supply tube 114 is positioned at each of the predetermined index locations. In some implementations, the fertigation supply tube 114 is positioned at a different set of predetermined index locations for one or more of the carrier growth paths 104. A drain 118 is positioned along a length L of the multi-layer hydroponics system 100 under the fertigation supply tubes 114 for catching and collecting spilled fertigation fluid. The drains 118 on each of the carrier growth paths 104 are all fluidically coupled to a vertical drain 120 on the first side 112 of the multi-layer hydroponics grow system 100 for collecting unused fertigation fluid in a fertigation supply system (not shown).

Likewise, a drain 122 is positioned on a second side 124 of the multi-layer hydroponics grow system 100 on each of the carrier growth paths 104. The drain 122 is positioned to receive fertigation fluid draining from an irrigation/nutrient exit port at the downward slope of the crop carriers 108. The drains 122 on each of the carrier growth paths 104 are all fluidically coupled to a vertical drain 126 on the second side 124 of the multi-layer hydroponics grow system 100 for collecting unused fertigation fluid in the fertigation supply system.

Briefly, the fertigation supply system comprises one or more pumps (not shown) for circulation fertigation fluid to the fertigation supply tubes 114. The fertigation supply system additionally includes a water supply (not shown) and one or more nutrient supplies (not shown) for maintaining a desired nutrient concentration in the fertigation fluid. One or more sensors (not shown) may measure a nutrient concentration of fertigation fluid returning to the fertigation supply system for measuring nutrient uptake by crops. Additionally or alternatively, one or more sensors may measure a nutrient concentration of fertigation fluid supplied to the fertigation supply tubes 114. In various implementations, the fertigation supply system may supply fertigation fluids with different nutrients and/or nutrient concentrations to different carrier growth paths 104 or growth cells along a given carrier growth path 104. Alternatively or additionally, a flow rate of fertigation fluid may be different on different carrier growth paths 104 or growth cells along a given carrier growth path 104. In various implementations, the fertigation supply system may be positioned under a lowest one of the growth paths 104.

Grow lights 128 are provided on each of the plurality of carrier growth paths 104 for supplying light to crops in the crop carriers 108. In the example shown, the grow lights 128 extend in a plurality of lines. Each line of the grow lights 128 extends along the length L of the multi-layer hydroponics system 100. The plurality of lines of the grow lights 128 are spaced apart across the width W of the multi-layer hydroponics system 100, where each line of the grow lights 128 is spaced apart from an adjacent line by a predetermined distance. In some examples, each line of the grow lights 128 extends along a portion of the length L of the multi-layer hydroponics system 100 equal to a length of a growth cell of a given carrier growth path 104. In other examples, the lines of grow lights 128 may extend along the width W and are spaced apart along the length of the multi-layer hydroponics system 100.

An air circulation system 130 treats and circulates air flows. The air circulation system 130 comprises air supply ducts and air return ducts within the multi-layer hydroponics system 100 to promotes vertical air flows 131 between the carrier growth paths 104 and between sequential ones of the crop carriers 108. The vertical air flows disrupt the microclimate around the crops to increase respiration and nutrient uptake, thereby increasing the growth rate of the crops. For example, for leafy crops, the vertical air flows disrupt the microclimate underneath the leaves of the crop to increase crop respiration.

The air circulation system 130 comprises a main air supply duct 132, a plurality of supply plenums 134, and a plurality of layer supply ducts 136. The main air supply duct 132 extends along the length L of the multi-layer hydroponics system 100 along the second side 124. A plurality of supply plenums 134 are in fluid communication with the main air supply duct 132. The plurality of supply plenums 134 extending along a height H of the multi-layer hydroponics system at a first set of predetermined locations along the length L of the multi-layer hydroponics system. Each of the plurality of supply plenums 134 are in fluid communication with a respective plurality of layer supply ducts 136. Each of the plurality of layer supply ducts 136 extend across a width W of the multi-layer hydroponics system 100 at a different layer or carrier growth path 104 of the multi-layer hydroponics system 100. In various implementations, one of the layer supply ducts 136 is not provided on a top carrier growth path 104. Each of the plurality of layer supply ducts 136 comprises a plurality of air supply holes. In various examples, one or more of the plurality of air supply holes are on a top half of one or more of the plurality of layer supply ducts 136. In various examples, the plurality of air supply holes may be spaced apart both circumferentially about the plurality of layer supply ducts 136 and laterally along each of the layer supply ducts 136.

The air circulation system 130 also comprises a main air return duct 138, a plurality of lateral air return ducts 140, and a plurality of air return registers 142. The main air return duct 138 runs along the length L and is centered in the width W of the multi-layer grow system 100. The plurality of lateral air return ducts 140 are in fluid communication with the main air return duct. The plurality of lateral air return ducts 140 extend along the width W at a second set of predetermined locations along the length L of the multi-layer grow system 100. Each of the plurality of lateral air return ducts 140 comprises a plurality of air return registers 142 spaced apart at predetermined distances across the width W of the multi-layer grow system 100. In various implementations, the second set of predetermined locations along the length W of the multi-layer grow system are the same as the first set of predetermined locations along the length L of the multi-layer grow system 100. That is, the plurality of lateral air return ducts 140 are located at the same position along the length L of the multi-layer grow system 100 as the plurality of layer supply ducts 136, such as shown in FIG. 1C.

The air circulation system 130 comprises an air conditioner (not shown) configured to maintain a temperature, humidity, and carbon dioxide level of air recirculated within the air supply ducts and air return ducts. Accordingly, the air conditioner may heat, cool, humidify, dehumidify the recirculated air, or add carbon dioxide. The air conditioner is configured to inject carbon dioxide to maintain an amount of carbon dioxide within air supplied to the air supply ducts between 400-5000 parts per million, preferably between 1000-3000 parts per million. In some implementations, the air conditioner is positioned between the main air supply duct 132 and the main air return duct 138 for treating recirculated air. Treating recirculated air improves efficiency of the system by not having to recondition outside air.

A first elevator 144 is positioned at the first end 101 of the multi-layer hydroponics system 100. A second elevator 146 is positioned at the second end 103 of the multi-layer hydroponics system 100, opposite from the first end 101. Each of the elevators 144, 146 are configured to individually receive, vertically lift, and deliver the crop carriers 108 to different ones of the carrier growth paths 104. For example, the elevators 144, 146 may be a material handling lift, electric mezzanine elevator, pallet rack lift, or any other such device adapted to retrieve, lift, deliver, and/or convey the crop carriers 108 between layers.

A multi-sensor device 150 may be positioned at one or more locations along the length and on one or more of the layers or carrier growth paths 104 of the multi-layer hydroponics system 100. In the example shown in FIG. 1C, the multi-sensor device 150 is positioned on each of the layers. In some examples, a single multi-sensor device 150 is positioned on the top layer 104e of the multi-layer hydroponics system 100. The multi-sensor device 150 uses a suite of sensors to measure one or more characteristics of crops and/or environment conditions around the crops. In some implementations, the suite of sensors includes a thermometer, thermal imager, camera, atmospheric pressure sensor, fertigation flow meter, hygrometer, air flow sensor, carbon dioxide sensor, photometer, or any combination thereof. In some implementations, distinct sensors are used as opposed to the multi-sensor device 150.

Figure 4A:
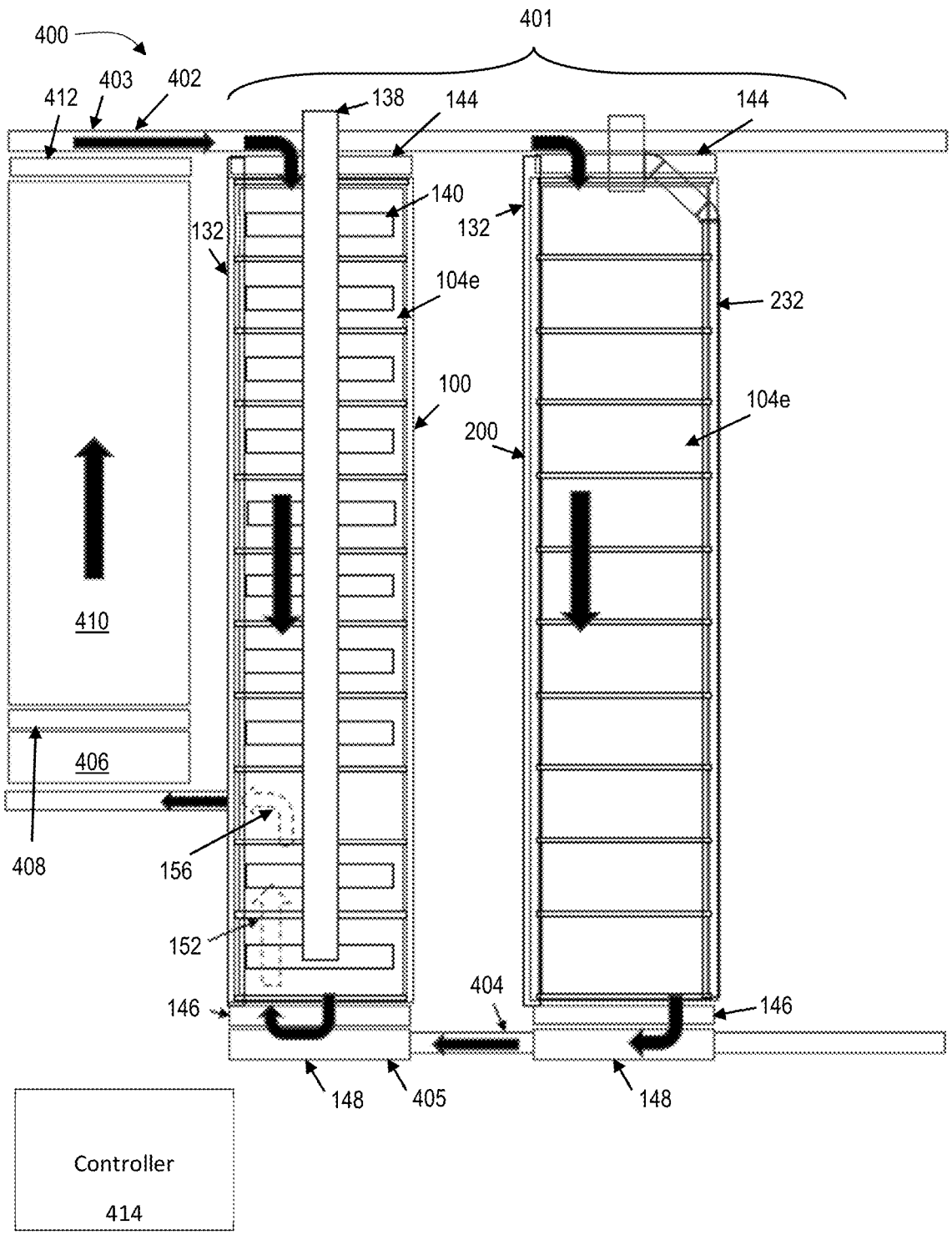
FIG. 4A shows a single loop continuous flow multi-layer grow system, according to various aspects of the disclosure.
Figure 4B:
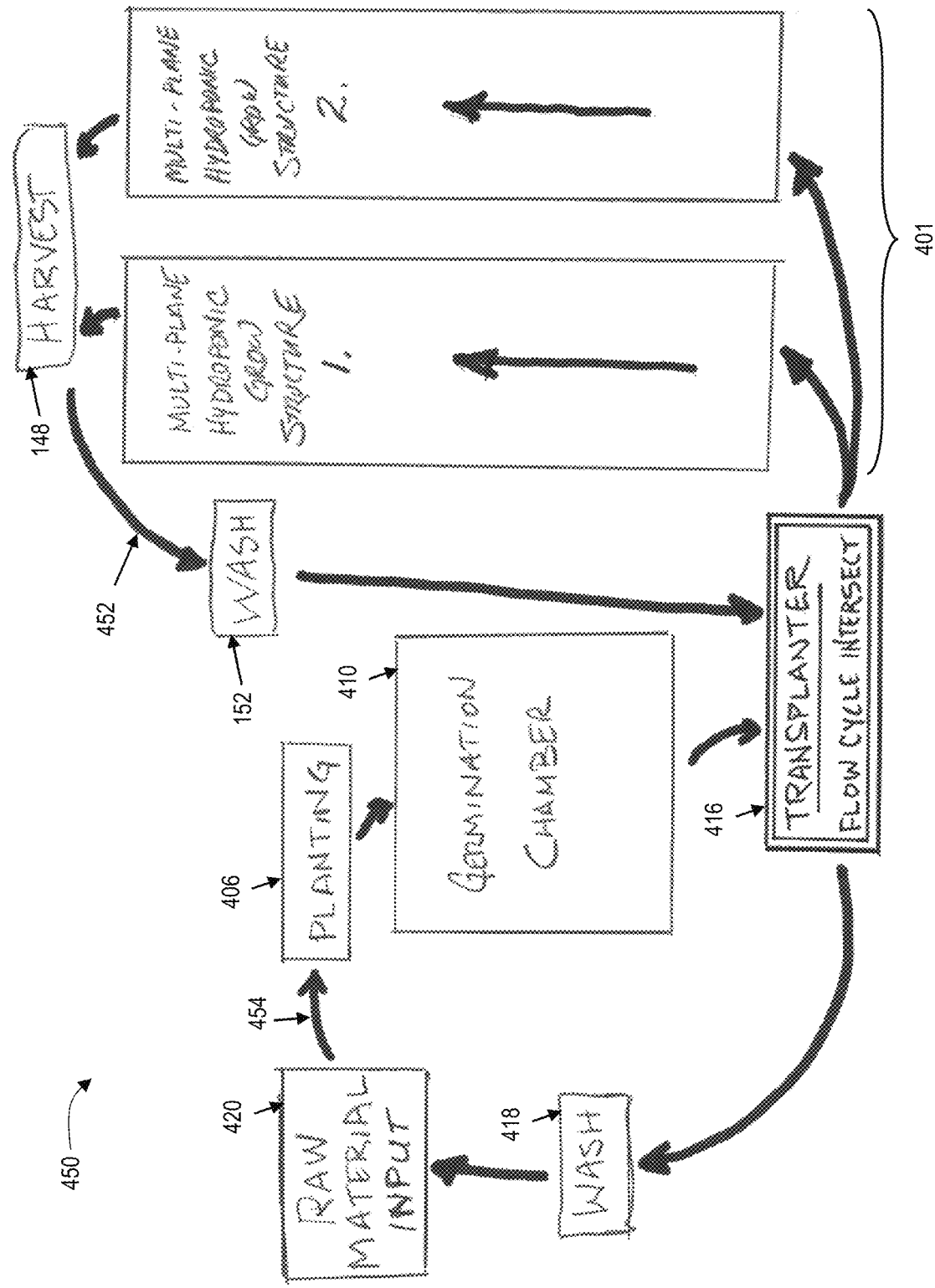
FIG. 4B shows a dual loop continuous flow multi-layer grow system, according to various aspects of the disclosure.

Each crop carrier 108 is part of a larger circulatory nutrition system, as shown in FIGS. 1A-1C, supporting all planes within the structure. FIGS. 1A-1C illustrate the serpentine path 102, which is a high-density flow pattern. The serpentine path 102 is the complete pattern an organism will traverse through its life cycle from germination to harvest, maximizing density, high quality yield and life cycle productivity. The elevator 144 at the first end 101 on a lowest level or first carrier path 104a of the plurality of growth paths 104 receives crop carriers 108 from a continuous flow germination area through cross system conveyance, as shown in FIGS. 4A-4B. The elevator 144 delivers the received crop carriers 108 to the conveyor 106 on the lowest level of the plurality of growth paths 104. In some implementations, the elevator 144 may deliver the received crop carriers 108 to other levels of the plurality of growth paths 104. Alternatively, the cross system conveyance may deliver the crop carriers 108 directly to the conveyor 106 on the lowest level 104a of the plurality of grow paths 104.

In the example shown in FIGS. 1A-1C, the crop carriers 108 follow a serpentine growth path 102. The crop carriers 108 are sequentially received on the first carrier path 104a and conveyed by the conveyor 106 along the length L of the multi-layer grow system 100 from the first end 101 to the second end 103. Upon reaching the second end 103, the second elevator 146 sequentially receives the crop carriers 108 from the first carrier path 104a, vertically lifts, and delivers each of the crop carriers 108 to the second carrier path 104b. The second carrier path 104b is vertically displaced along the height H at a next highest layer of the multi-layer grow system from the first carrier path 104a. Likewise, the conveyor 106 on the second carrier path 104b sequentially receives and conveys crop carriers 108 along the length L of the multi-layer grow system 100 from the second end 103 to the first end 101 of the multi-layer grow system 100. Upon reaching the first end 101 on the second carrier path 104b, the first elevator 144 sequentially receives the crop carriers 108 from the second carrier path 104b, vertically lifts, and delivers each of the crop carriers 108 to a third carrier path 104c. The third carrier path 104c is vertically displaced along the height H at a next highest layer of the multi-layer grow system 100 from the second carrier path 104b.

The conveyor 106 on the third carrier path 104c sequentially receives and conveys the crop carriers 108 along the length L of the multi-layer grow system 100 from the first end 101 to the second end 103 of the multi-layer grow system 100. Upon reaching the second end 103 on the third carrier path 104b, the second elevator 146 sequentially receives the crop carriers 108 from the third carrier path 104c, vertically lifts, and delivers each of the crop carriers 108 to a fourth carrier path 104d. The fourth carrier path 104d is vertically displaced along the height H at a next highest layer of the multi-layer grow system 100 from the third carrier path 104c.

The conveyor 106 on the fourth carrier path 104d sequentially receives and conveys crop carriers 108 along the length L of the multi-layer grow system 100 from the second end 103 to the first end 101 of the multi-layer grow system 100. Upon reaching the first end 101 on the fourth carrier path 104d, the first elevator 144 sequentially receives the crop carriers 108 from the fourth carrier path 104d, vertically lifts, and delivers each of the crop carriers 108 to a fifth carrier path 104e. The fifth carrier path 104e is vertically displaced along the height H at a highest or top layer of the multi-layer grow system 100 from the fourth carrier path 104d.

The conveyor 106 on the fifth carrier path 104e sequentially receives and conveys the crop carriers 108 along the length L of the multi-layer grow system 100 from the first end 101 to the second end 103 of the multi-layer grow system 100. Upon reaching the second end 103 on the fifth carrier path 104e, the second elevator 146 sequentially receives the crop carriers 108 from the fifth carrier path 104e, and vertically lowers the crop carriers 108 to a harvest location 148. The harvest location 148 may be located at a height to facilitate ergonomic harvesting of crops from the crop carriers 108. In some implementations, a vertical height of the harvest location 148 is adjustable from one or more local controls or a central controller. In some implementations, the second elevator 146 may provide the crop carriers 108 to a harvest line (not shown). In some implementations, one or more robots (not shown) automate harvesting of crops from the crop carriers 108 and placement into packages.

In some implementations, the highest or top layer of the multi-layer grow system 100 is taller than other layers of the multi-layer grow system 100 to accommodate more mature crops. For example, a height of the fifth carrier path 104e is greater than a height on any of the first through fourth carrier paths 104a-104d. In some implementations, such as in a greenhouse, the highest or top layer of the multi-layer grow system 100 may not have the grow lights 128. In some implementations, more than one of the layers of the multi-layer grow system 100 may have different heights to accommodate crops at different stages of their growth cycle. In some implementations, each of the layers of the multi-layer grow system 100 may have a different height.

In various implementations, the second elevator 146 has an inner elevator and an out elevator. The inner elevator facilitates lifting crop carriers 108 between each of the carrier paths 104 (e.g., between the first and second carrier paths 104a, 104b and between the third and fourth carrier paths 104c, 104d). The outer elevator facilitates lifting crop carriers 108 between the fifth carrier path 104e and the harvest location 148. In some implementations, the inner and outer elevators form a loop. In this way, each of the crop carriers 108 wind their way from a bottom to a top and back and forth from end to end in the multi-layer grow system 100.

A speed of the conveyor 106 (e.g., a frequency of indexing, velocity of conveyance, timing of stop gates, etc.) is configurably controllable for each of the carrier growth paths 104. With the serpentine growth path 102, the conveyor 106 on different ones of the carrier growth paths 104 operate at different speeds. Accordingly, as the crop carriers 108 traverse from one layer, level, or carrier growth path 104 to the next, the crop carriers 108 are spaced further apart. That is, the spacing between sequential ones of the plurality of crop carriers 108 increases at each successive layer, level, or carrier path 104 of the multi-layer grow system 100.

As best seen in FIG. 1C, each of the crop carriers 108 is directly adjacent to prior and successive crop carriers 108 on the first carrier growth path 104a. Each successive carrier growth path 104 provides additional spacing according to NFT indexing methods. The spacing between the crop carriers 108 allow increasing amounts of the vertical air flows 131 between the crop carriers 108.

In some implementations, the multi-layer grow system 100 comprises a wash station 152 positioned on a utility layer 154 that is located under the lowest level 104a of the plurality of grow paths 104. The wash station 152 is configured to convey the crop carriers 108 which have had crops harvested at the harvest location 148 through washing sprays to clean each of the crop carriers 108. Following the wash station 152, the crop carriers 108 may exit from a side the multi-layer grow system 100 at an intermediate location 156 along the utility layer 154, as described in more detail below with reference to FIGS. 4A and 4B.

Figure 2A:
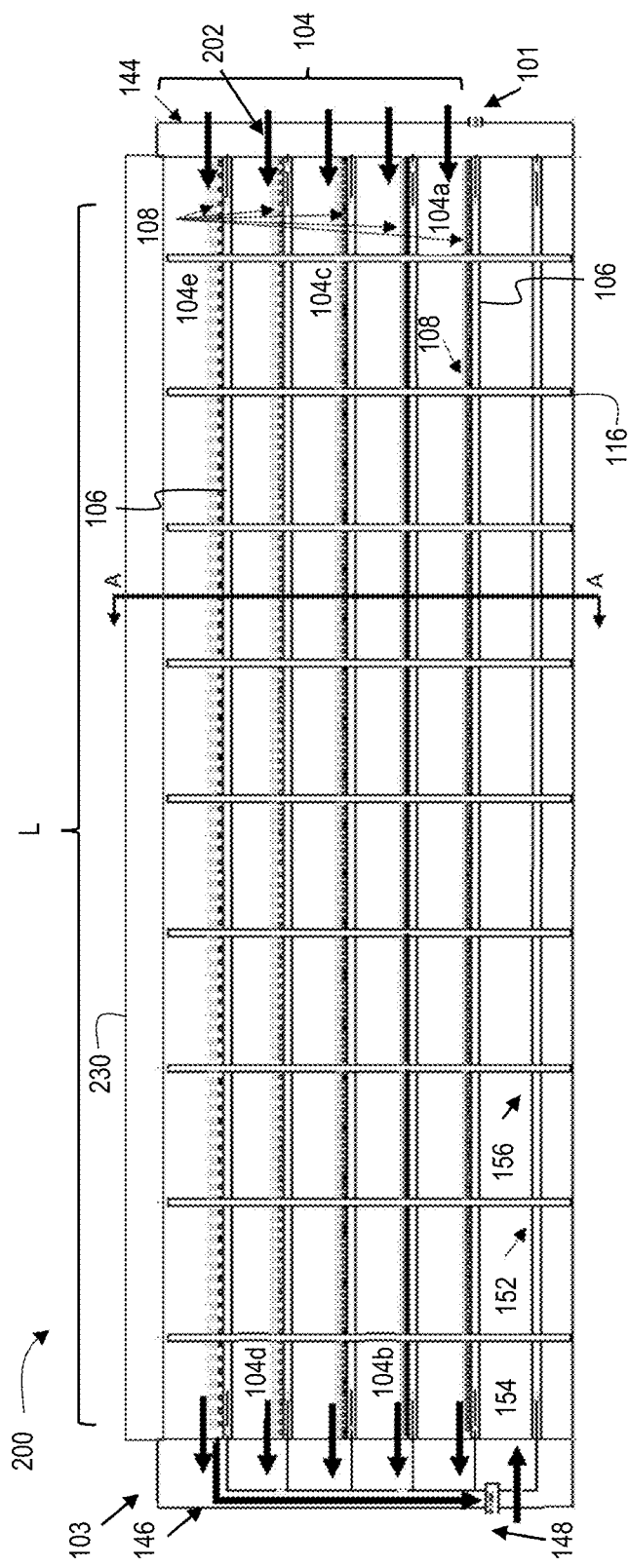
FIG. 2A is a side view of a multi-layer hydroponics grow system with horizontal air flows, according to various aspects of this disclosure.
Figure 2B:
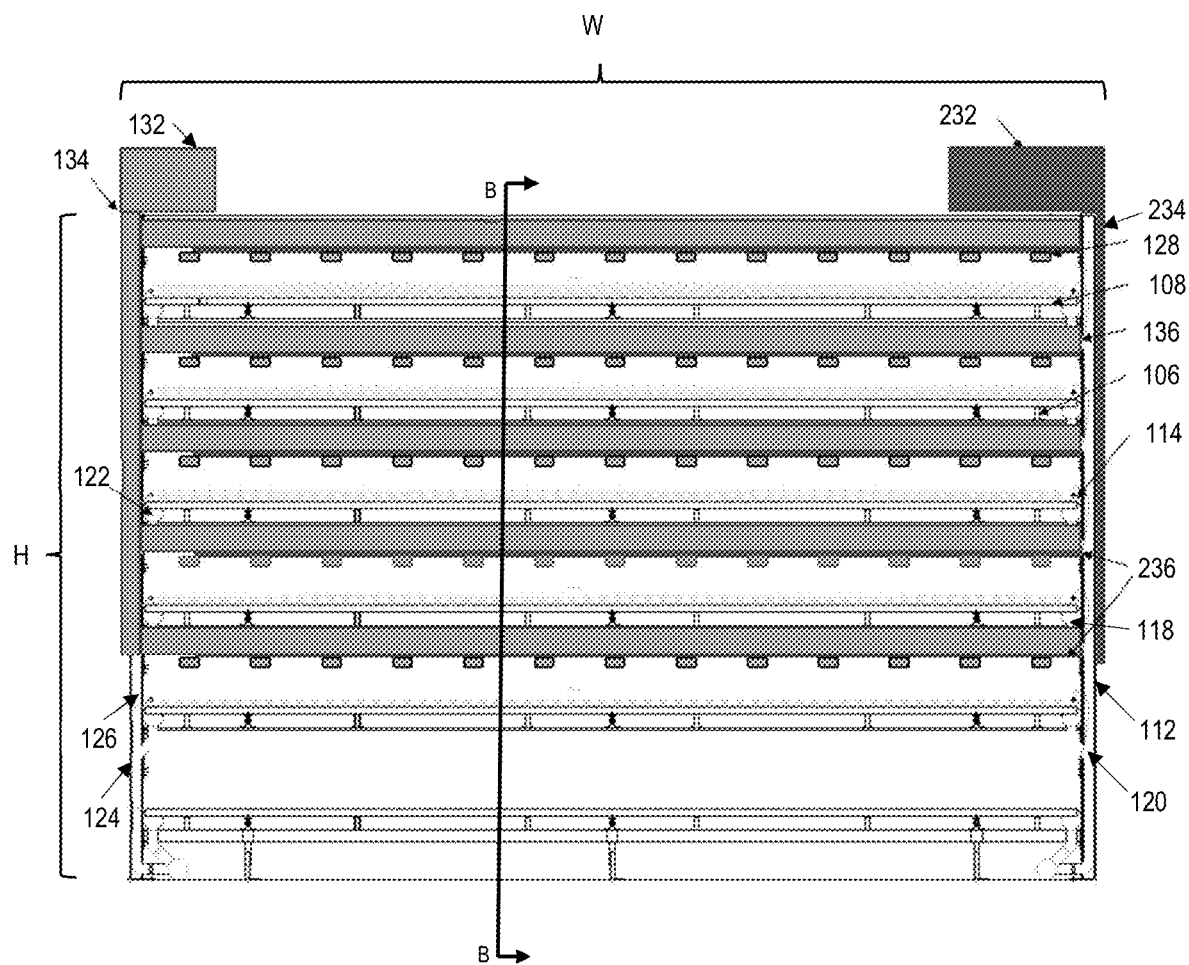
FIG. 2B is a cross-sectional view across a width of the multi-layer hydroponics grow system at the line A-A of FIG. 2A, according to various aspects of this disclosure.
Figure 2C:
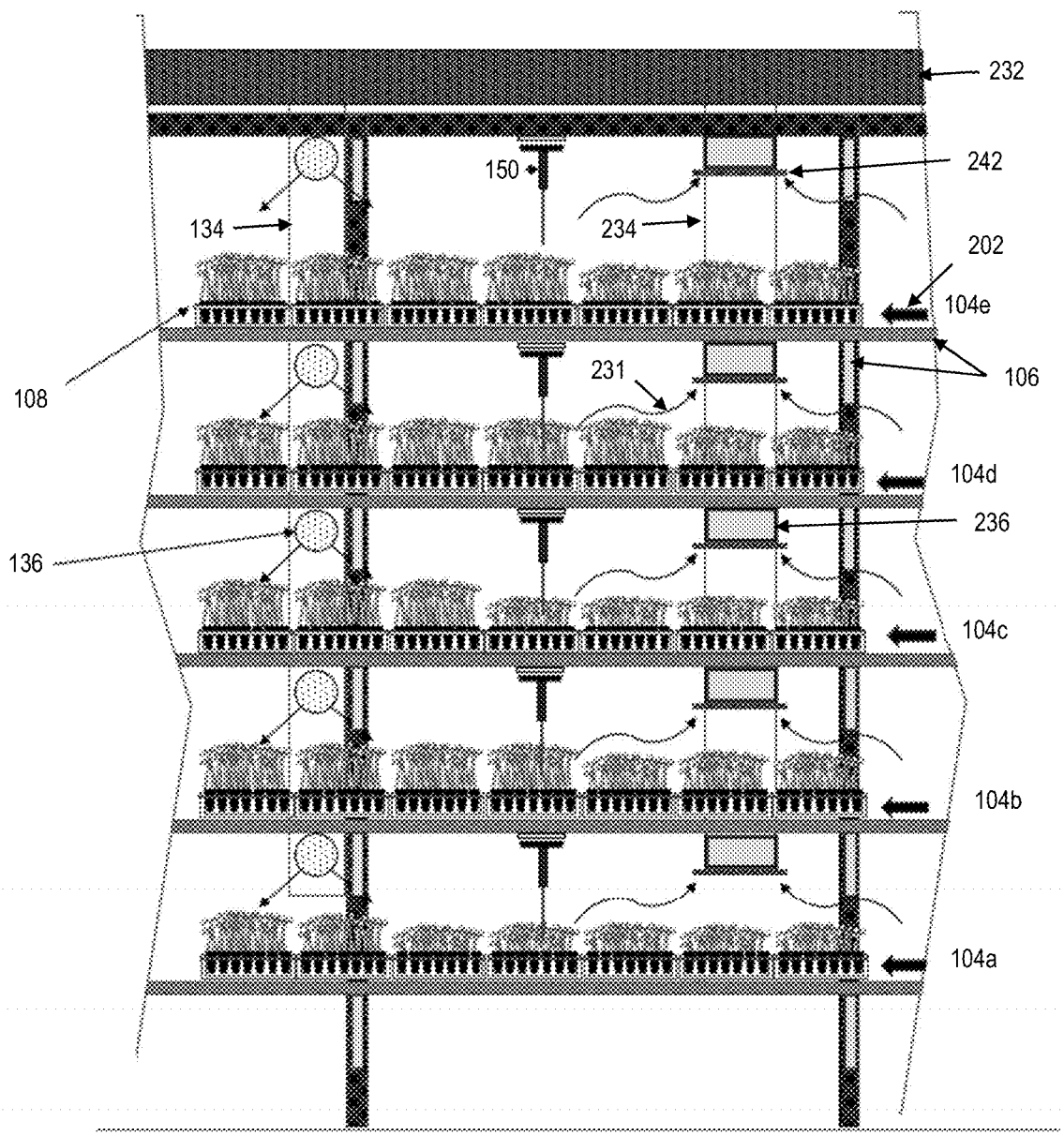
FIG. 2C is a cross-sectional view across a length of the multi-layer hydroponics grow system at the line B-B of FIG. 2B with a straight growth path, according to various aspects of the disclosure.
Figure 2D:
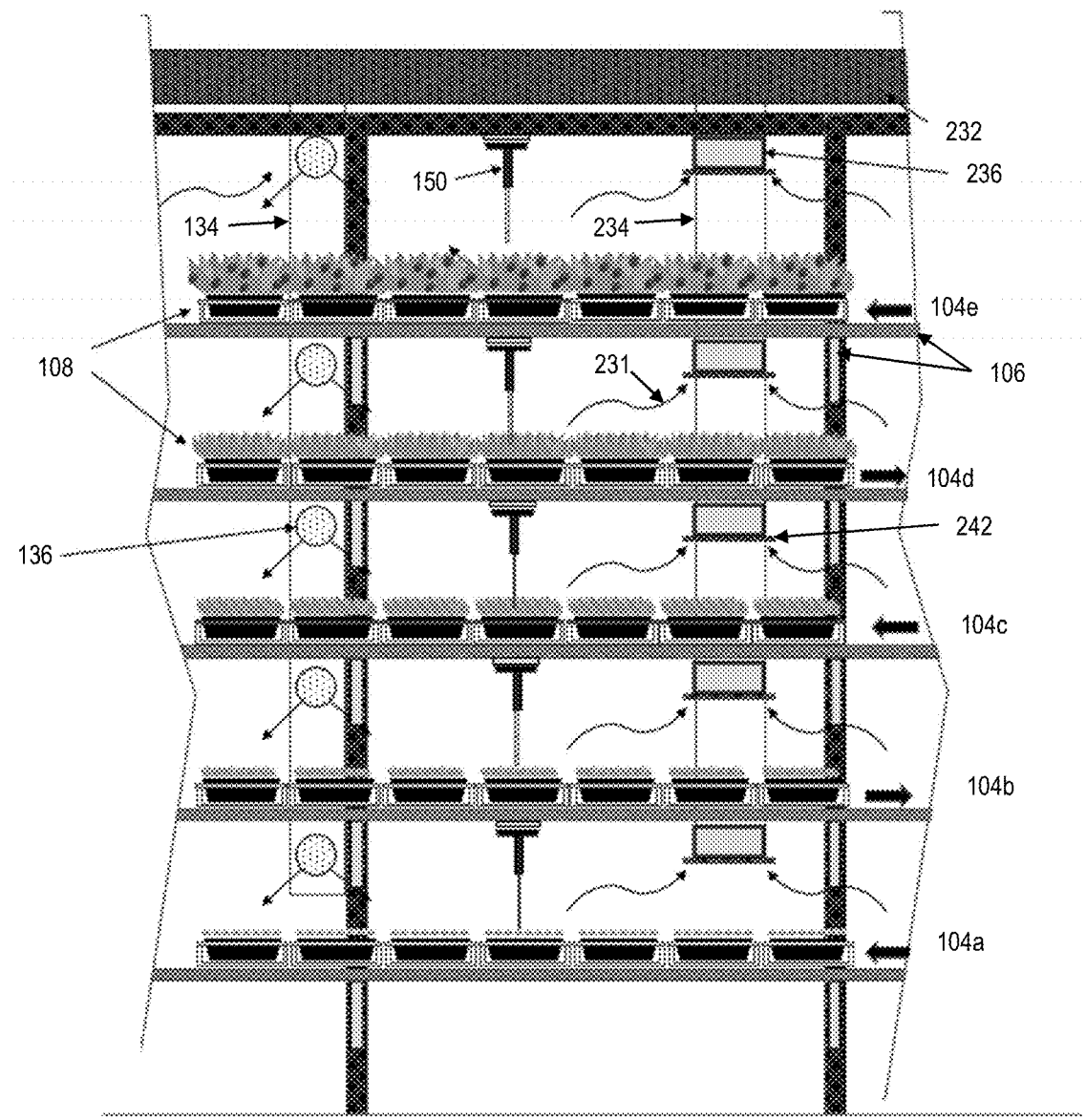
FIG. 2D is a cross-sectional view across a length of the multi-layer hydroponics grow system at the line B-B of FIG. 2B with a carousel or serpentine carousel growth path, and horizontal air flows according to various aspects of the disclosure.

FIG. 2A is a side view of a multi-layer hydroponics grow system 200 with horizontal air flows, according to various aspects of this disclosure. FIG. 2B is a cross-sectional view across a width of the multi-layer hydroponics grow system 200 at the line A-A of FIG. 2A, according to various aspects of this disclosure. FIG. 2C is a cross-sectional view across a length of the multi-layer hydroponics grow system 200 at the line B-B of FIG. 2B with a straight growth path. FIG. 2D is a cross-sectional view across a length of the multi-layer hydroponics grow system 200 at the line B-B of FIG. 2B with a serpentine, carousel, or serpentine carousel growth path. A structure of the multi-layer hydroponics grow system 200 is substantially similar with the structure of the multi-layer hydroponics grow system 100, where like numerals represent like parts and a description thereof is not repeated. While the examples provided herein reference the multi-layer hydroponics grow system 200, the system may alternatively be referred to as a multi-layer grow system 200. References to hydroponics throughout this disclosure are not intended to be limiting, but are provided as an example of one type of growth mechanism.

The multi-layer hydroponics grow system 200 has a different air circulation system 230 that treats and circulates air flows. The air circulation system 230 comprises air supply ducts and air return ducts within the multi-layer hydroponics system 200 to promote horizontal air flows 231 along the carrier growth paths 104. The horizontal air flows 231 are useful for when the crop carriers 108 are positioned directly adjacent to prior and successive crop carriers 108 on each of the carrier growth paths 104 or the vertical air flows 131 described above would otherwise be prevented or not desired.

Similar to the multi-layer grow system 100, the air circulation system 230 comprises a main air supply duct 132, a plurality of supply plenums 134, and a plurality of layer supply ducts 136, the description of with are referenced above. In various examples, one or more of the plurality of air supply holes on the layer supply ducts 136 are not on a top half of one or more of the plurality of layer supply ducts 136. That is, the air supply holes on the layer supply ducts 136 are positioned on a lower half of the plurality of layer supply ducts 136.

The air circulation system 230 also comprises a main air return duct 232, a plurality of return plenums 234, a plurality of sets of layer air return ducts 236, and a plurality of air return registers 242. The main air return duct 232 runs along the length L on the first side 112 of the multi-layer grow system 200. The plurality of return plenums 234 are in fluid communication with the main air return duct 232. The plurality of return plenums 234 extend along a height H of the multi-layer hydroponics system at a second set of predetermined locations along the length L of the multi-layer hydroponics system 200. The second plurality of predetermined locations of the plurality of return plenums 234 is interleaved with the first plurality of predetermined locations of the plurality of supply plenums 134. Each of the plurality of return plenums 234 are in fluid communication with a respective set of the layer return ducts 236. Each of the plurality of layer return ducts 236 in a given set extend across a width W of the multi-layer hydroponics system 200 at a different layer or carrier growth path 104. Each of the plurality of layer return ducts 236 comprises a plurality of air return registers 242 spaced apart at predetermined distances across the width W of the multi-layer grow system 200. Along the length L of the multi-layer grow system 200 the sets of layer air supply ducts 136 alternate with the sets of layer air return ducts 236, as best seen in FIGS. 2C-2D.

In the example shown in FIGS. 2A and 2C, the crop carriers 108 move across each of the carrier growth paths 104 in a straight growth path 202. In the straight growth path 202, the crop carriers 108 are moved by the conveyor 106 on each of the respective carrier growth paths 104 from the first end 101 to the second end 103 of the multi-layer grow system 200 without traversing any of the other carrier growth paths 104. That is, upon reaching the second end 103 of a respective carrier growth path 104, the crop carriers 108 are individually positioned at the harvest location 148 by the second elevator 146. In various implementations, the second elevator 146 may sequence between each of the carrier growth paths 104 for transporting the crop carriers 108 to the harvest location 148. For example, the second elevator 146 may initially transport the crop carrier 108 at the second end 103 of the first growth path 104a to the harvest location 148. The second elevator 146 may then transport the crop carrier 108 at the second end 103 of the second growth path 104b to the harvest location 148, and so on. Upon transporting the crop carrier 108 at the second end 103 of fifth growth path 104e, the cycle may repeat again starting at the first growth path 104a. Other starting and ending points for the cycle may be used, such as to start by harvesting the crop carrier on the second growth path 104b first.

In the example shown in FIG. 2D, the crop carriers 108 move across each of the carrier growth paths 104 in the serpentine growth path 102, described above. Additional growth paths are contemplated by this disclosure, including a carousel and a serpentine carousel growth path.

A carousel growth path transports the crop carriers 108 back and forth between two of the carrier growth paths 104. The carousel growth path is useful for crops which can be harvested multiple times. For example, with reference to FIG. 2D, a carousel growth path may be used on the fifth carrier growth path 104e and the fourth carrier growth path 104d. As crops reach the second end 103 of the fifth carrier growth path 104e and are harvested at the harvest location 148, rather than completely removing the crop and washing the crop carrier 108, the crop carrier 108 is instead transported to the second end 103 of the fourth carrier growth path 104d by the second elevator 146. Upon reaching the first end 101 of the fourth carrier growth path 104d, the first elevator 144 receives, lifts, and delivers the crop carrier 108 to the fifth carrier growth path 104e. By traversing the length of the multi-layer growth system 200 on the fourth carrier growth path 104d and the fifth carrier growth path 104e, crops contained within the crop carrier have sufficient time to grow harvestable products again.

Multiple sets of carousel growth paths may be used at the same time. For example, a first carousel growth path may be used with the fifth carrier growth path 104e and the fourth carrier growth path 104d, as described above. A second carousel growth path may be used with the third carrier growth path 104c and the second carrier growth path 104b. Periodically, crops carried by the crop carriers 108 will stop producing or have reduced production. In such a case, the crops will be removed from the crop carriers 108 and the crop carriers 108 may be washed at the washing station 152, as described above. In such a case, a crop carrier 108 from the first carrier growth path 104a may be used to replace the exhausted crop carrier in the carousel growth path. Other variations are contemplated by this disclosure.

A serpentine carousel growth path operates similar to the carousel growth path described above, but extends across more than two of the carrier growth paths. The serpentine carousel growth path provides additional time for regrowth of harvestable products. For example, with reference to FIG. 2D, a serpentine carousel growth path may be used on the second through the fifth carrier growth paths 104b-104e. As crops reach the second end 103 of the fifth carrier growth path 104e and are harvested at the harvest location 148, rather than completely removing the crop and washing the crop carrier 108, the crop carrier 108 is instead transported to the second end 103 of the second carrier growth path 104b by the second elevator 146. The crop carrier 108 then follows the serpentine path 102 described above to again reach the second end 103 of the fifth carrier growth path 104e and be transported to the harvest location 148 again.

While the examples provided above in FIGS. 1A-2D describe a hydroponic grow system using NFT carriers, other types of grow systems are contemplated by this disclosure. For example, traditional soil based grow systems may be used with one or more of the teachings described herein. In various implementations, the systems 100, 200 described above are multi-plane growing systems with more than two planes, layers, or levels to provide high-density crop growing systems.

FIG. 3 shows a plurality of carriers suitable for use with the multi-layer hydroponics grow systems 100, 200, according to various aspects of the disclosure. Each of the carriers has four sides with smooth vertical sides and a bottom with tracking ribs (not shown). A round opening carrier 302 has a plurality of round or elliptical openings 304. The round openings 304 are typically used for receiving a sub-carrier, such as a pot. Various diameter openings may be used depending on the crop. The round opening carrier 302 has a receiving port 306 for receiving a fertigation fluid from the fertigation supply tube 114 and an exit port 308 for delivering remaining fertigation fluid to the drain 122.

A slot opening carrier 310 has a plurality of slot openings 312 is typically used for media seed strips or other precision cultivation or precision post-harvest processing. The slot opening carrier 310 has a receiving port 314 for receiving a fertigation fluid from the fertigation supply tube 114 and an exit port 316 for delivering remaining fertigation fluid to the drain 122.

A quadrilateral tray carrier 318 has a plurality of quadrilateral openings 320 that are typically used for receiving sub-carriers for growing a variety of plants, organisms, etc. The quadrilateral tray carrier 318 has a receiving port 322 for receiving a fertigation fluid from the fertigation supply tube 114 and an exit port 324 for delivering remaining fertigation fluid to the drain 122.

A trough rectangular tray carrier 326 has a single quadrilateral opening 328 that is used for receiving various sized trays or other sub-carriers. The trough rectangular tray carrier 326 has a receiving port 330 for receiving a fertigation fluid from the fertigation supply tube 114 and an exit port 332 for delivering remaining fertigation fluid to the drain 122.

An open bed carrier 334 is an open bed that is used for organism growth and special processing. One end of the open bed carrier 334 can receive fertigation fluid from the fertigation supply tube 114 and an exit port 336 delivers remaining fertigation fluid to the drain 122. In some implementations, an open bed carrier receives no fertigation fluid, and the organism relies on high humidity for nutritional development, such as fungi. Other types of crop carriers are contemplated by this disclosure.

FIG. 4A shows a single loop continuous flow multi-layer grow system 400, according to various aspects of the disclosure. In the interest of clarity, "continuous" is used throughout this disclosure to refer to systems that operate at a set flow rate, despite a potential stop and start motion of conveyors contained within the system. The continuous systems described herein operate to deliver about the same amount (e.g., within at least 25% or less variance between crops) of harvestable crops a day (or other harvest time interval) according to a demand required of customers (e.g., grocers, etc.). The single loop continuous flow multi-layer grow system 400 comprises a plurality of growing lines or multi-layer grow systems 401 arranged in parallel. In the example shown in FIG. 4A, there are two multi-layer grow systems 401, including one of the multi-layer grow system 100 and one of the multi-layer grow system 200. In other examples more or fewer multi-layer grow systems 401 may be present. In some implementations, all of the multi-layer grow systems 401 may be of the same type (e.g., all multi-layer grow system 100 or all multi-layer grow system 200). Other types of grow lines may be used.

In some implementations, different types of the crop carriers 108 are used on a different ones of the multi-layer grow systems 401. Each of the plurality of growing lines 401 is configured to receive one of a plurality of types of crop carriers 108. In some implementations, the growing path on a first of the plurality of multi-layer growing lines 401 is different than the growing path on a second of the plurality of multi-layer growing lines 401. In other implementations, each the growing paths on each of the plurality of multi-layer growing lines 401 is the same. As described above, the growing paths include the serpentine growing path 102, the straight growing path 202, the carousel growing path, and the serpentine carousel growing path. Other growing paths may be used. In some implementations, different types of crops are conveyed to different ones of the multi-layer grow systems 401. In other implementations, different crops may be grown in the same one of the multi-layer grow systems 401 as long as the different crops have the same lifecycle.

An input conveyor 402 extends along a first side 403 of the multi-layer grow system 400. The input conveyor 402 is parallel to the first elevator 144 on each of the plurality of multi-layer growing lines 401. Accordingly, the input conveyor 402 is configured to convey the crop carriers 108 to a desired one of the plurality of multi-layer growing lines 401. The input conveyor 402 and the first elevator 144 on the one of the plurality of multi-layer growing lines 401 cooperate to load the crop carrier 108 from the input conveyor 402 to an appropriate one of the carrier growth paths 104 according to the growth path used on the one of the plurality of multi-layer growing lines 401. Upon traversing the growth path of the one of the plurality of multi-layer growing lines 401, the crop carrier 108 is transported to the harvest location 148.

An output conveyor 404 extends along a second side 405 of the multi-layer grow system 400. In the example shown, the output conveyor 404 extends along each of the plurality of multi-layer growing lines 401. The output conveyor 404 is parallel to the second elevator 146 on each of the plurality of multi-layer growing lines 401. In some implementations, the output conveyor 404 is located below the harvest location 148. Following harvest, the crop carriers 108 may be manually or automatically lowered to the output conveyor 404, such as with the second elevator 146 or another elevator. The output conveyor 404 is configured to sequentially convey each of the plurality of crop carriers 108 to the wash station 152. In the example shown, the wash station 152 is positioned at a first of the plurality of multi-layer growing lines 401. Upon exiting the first of the plurality of multi-layer growing lines 401 at the intermediate location 156, the crop carriers 108 are transported to a planting station 406 and a multi-layer germination chamber 410.

The planting station 406 is adapted to sequentially receive the plurality of crop carriers 108 from the wash station 152 and convey the plurality of crop carriers 108 with crops planted therein to the multi-layer germination chamber 410. The planting station 406 is an automatic planting station configured to sequentially insert growing medium and starter crops to germinate into each of the plurality of crop carriers 108. The starter crops are one of seeds, spores, fungi, cuttings, or tubers.

The multi-layer germination chamber 410 is configured to receive the plurality of crop carriers 108 with crops planted therein. The multi-layer germination chamber 410 has an input elevator 408 and an output elevator 412. The input elevator 412 is configured to sequentially receive the crop carriers 108 from the planting station 406, optionally vertically lift, and deliver each of the plurality of crop carriers 108 to one of a plurality of layer in the multi-layer germination chamber 410. Each layer of the multi-layer germination chamber 410 is configured to convey a subset of the plurality of crop carriers 108 from a first end to a second end of the germination chamber 410 to germinate the crops planted therein.

An output elevator 410 is configured to sequentially receive the crop carriers from the second end of the germination chamber 410, optionally vertically lower, and deliver each of the plurality of crop carriers 108 to the input conveyor 402. The input conveyor 402 is configured to sequentially convey each of the plurality of crop carriers 108 from the multi-layer germination chamber 410 to one of the plurality of multi-layer growing lines 401, as described above.

One or more layers of the multi-layer germination chamber 410 have different growing conditions. For example, a first layer of the multi-layer germination chamber 410 has different growing conditions than a second layer of the multi-layer germination chamber 410. The different growing conditions on each layer of the multi-layer germination chamber 410 include a difference in conveyance speed, humidity, and temperature. In some implementations, each layer of the multi-layer germination chamber 410 has the same growing conditions. One or more layers of the multi-layer germination chamber 410 receives and conveys a different type of crop carrier 108. For example, a first layer of the multi-layer germination chamber 410 receives and conveys a different type of crop carriers 108 than a second layer of the multi-layer germination chamber 410. In some implementations, each layer of the multi-layer germination chamber 410 conveys the same type of crop carriers 108.

A controller 414 is configured to route each of the crop carriers 108 with germinated crops from the germination chamber 410 along the input conveyor 402 to a corresponding one of the plurality of multi-layer grow lines 401. The controller 414 may also adapt the growing conditions on one or more layers of the multi-layer germination chamber 410 or on one or more layers on one or more of the plurality of multi-layer grow lines 401. The controller 414 may also control operation of the air conditioner and fertigation supply system as described above.

The single loop continuous flow multi-layer grow system 400 provides a continuous loop for conveyance of the crop carriers 108 from the germination chamber 410 to the multi-layer grow lines 401 and back. Therefore, the wash station 152 provides a single control point for cleaning the crop carriers 108. Additionally, by using the same crop carriers 108 for both the germination chamber 410 and the multi-layer grow lines 401, crops are not shocked from transplantation, which can add a day or more to a growth lifecycle of a crop. Rather than using a higher density carrier for germination, in various implementations, additional layers may be added to the germination chamber 410 as needed to reach a desired output of germinated crops.

FIG. 4B shows a dual loop continuous flow multi-layer grow system 450, according to various aspects of the disclosure. The system 450 comprises a grow loop 452 and a germination loop 454, each of which use a different crop carrier. The germination loop 454 uses a first set of crop carriers (not shown), such as a high density plug tray, pot tray, custom tray, or other high density germination tray, collectively referred to herein as germination trays. The first set of crop carriers have a first crop density for germinating a large number of crops. The grow loop 452 uses a second set of crop carriers 108 with a second crop density that is lower than the first crop density so as to provide sufficient space for crop growth. In various implementations, a ration of the first density to the second density is between 2:1 to 10:1. In some implementations, the ration of the first density to the second density is 4:1.

A transplanting station 416 is configured to transplant crops from the first crop carriers to the second set of crop carriers. The transplanting station 416 also comprises cross-conveyance (not shown) for interfacing between the grow loop 452 and a germination loop 454. The transplanting station 416 is configured to receive the first set of the crop carriers from the multi-layer germination chamber 410 and configured to receive the second set of the crop carriers 108 from the wash station 152. The transplanting station 416 is also configured to convey the second set of the crop carriers 108 to an appropriate one of the plurality off multi-layer grow lines 401 with crops transplanted therein. The transplanting station 416 is also configured to convey the first set of the crop carriers to a second wash station 418.

The second wash station 418 is configured to convey the first set of the crop carriers which have had crops transplanted at the transplanting station 416 through washing sprays to clean each of the first set of the crop carriers. Following the wash station 418, first set of the crop carriers have raw materials input therein at 420 and additional crops planted for germination at a planting station 406. In various implementations, the raw material input 420 and planting station 406 may be combined.

The planting station 406 is adapted to sequentially receive the first set of the crop carriers from the second wash station 418 and convey the first set of the crop carriers with crops planted therein to the multi-layer germination chamber 410.

FIG. 4C shows exemplary configurations of multi-layer hydroponics grow systems for different crops, according to various aspects of the disclosure. As shown, each configuration is a unique combination of organism type 422, starter crop 424, carrier type 426, germination conditions 428 (e.g., germination time, humidity, temperature), growth path 430 (e.g., serpentine, straight, carousel, serpentine carousel), airflow 432 (e.g., vertical or horizontal), space indexing 434 between crop carriers 108 (e.g., having spacing or not), climate control zone 436 (e.g. vertical or horizontal), and growth environment conditions (e.g., lighting intensity, lighting duration/cycling, air flow, temperature, humidity, nutrient types, nutrient levels, carbon dioxide levels, conveyance speed, etc.). The multi-plane hydroponics growth system, as shown and described herein, incorporates the Japanese Kan-Ban elements with automatically conveyed trays and carriers traversing through fully connected multi-plane germination and production systems at the pace of harvesting and the pace of customer demand using a master planning system informed by consumer sales, thereby minimizing supply chain waste and maximizing high quality yield.

Figure 5A:
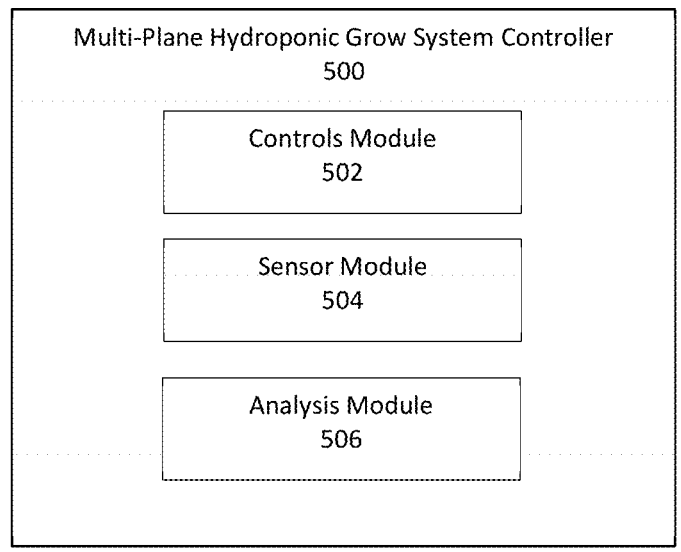
FIG. 5A shows an exemplary control system for operating the multi-layer hydroponics grow system, according to various aspects of the disclosure.

FIG. 5A shows an exemplary control system 500 for operating the multi-layer hydroponics grow systems, according to various aspects of the disclosure. The control system 500 comprises a controls module 502, a sensor module 504, and an analysis module 506. The sensor module 504 receives sensor readings from one or more sensors (e.g., multi-sensor device 150) on one or more layers 104 of one or more multi-layer growth systems 401. The analysis module 506 evaluates the sensor readings using one or more control algorithms. The control algorithms may include machine learning control algorithms (e.g., convolutional neural networks, etc.) for evaluating images of growing crops as well as environmental conditions. Based on the analysis from the analysis module 506, the controls module 502 controls one or more of the germination and/or growing conditions for modifying crop growth to a desired state.

Figure 5B:
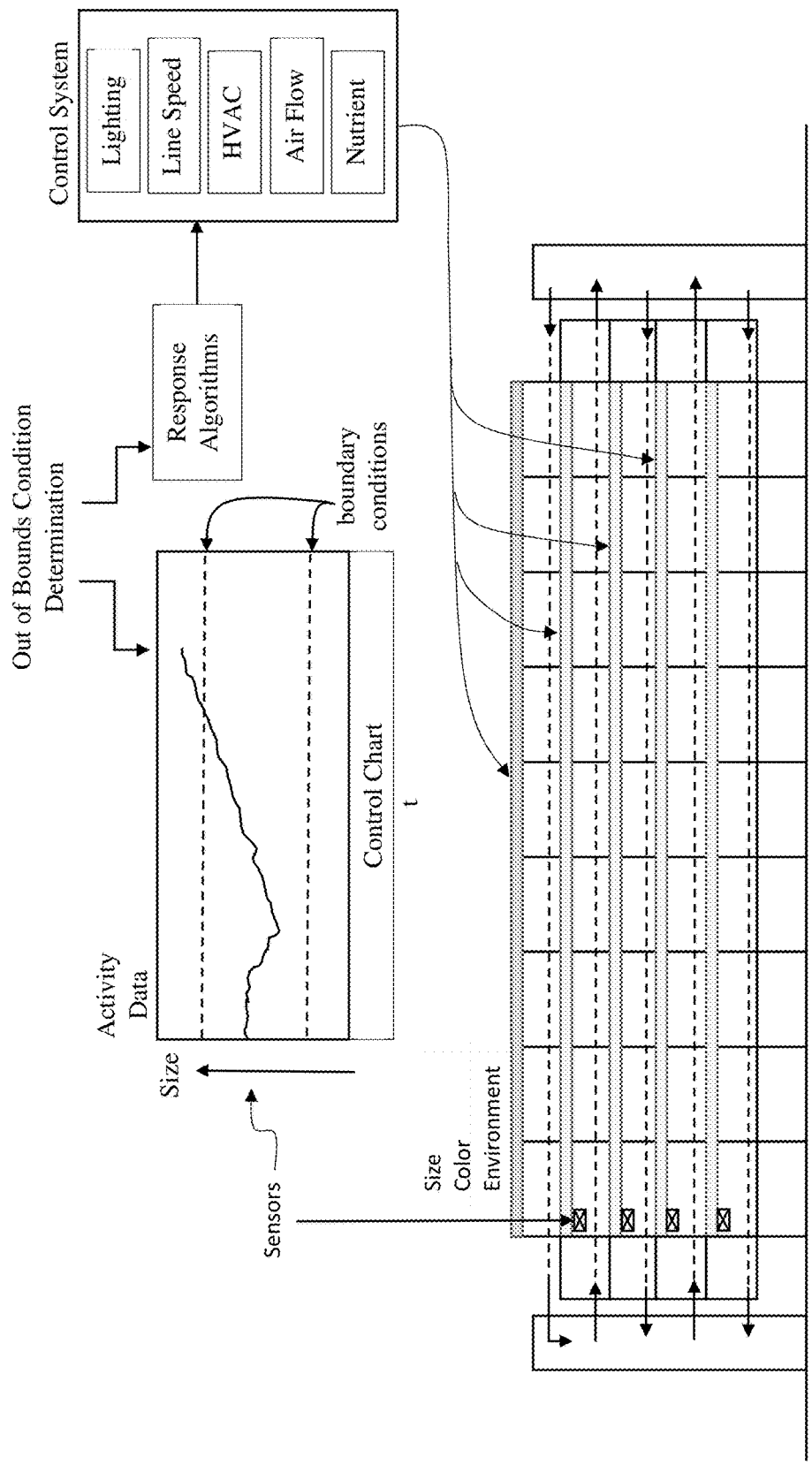
FIG. 5B shows climate control, various process and organism quality sensors, and correction performed by the control system, according to various aspects of the disclosure.

For example, as shown in FIG. 5B, climate control and correction may be performed by the control system 500. The sensor module 504 receives and processes sensor readings from one or more layers on one or more of the plurality of multi-layer grow lines 401. The analysis module 506 evaluates the sensor readings and identifies out of bounds conditions (e.g., crop growth too fast or too slow) and generates a control response. The controls module 504 controls one or more of the germination and/or growing conditions based on the determined control response. For example, one or more of lighting, conveyor speed, air conditioning, air flow, nutrient flow, or nutrient concentration may be modified on one or more layers on one or more of the plurality of multi-layer grow lines 401 or within a growth cell therein.

Figure 6:
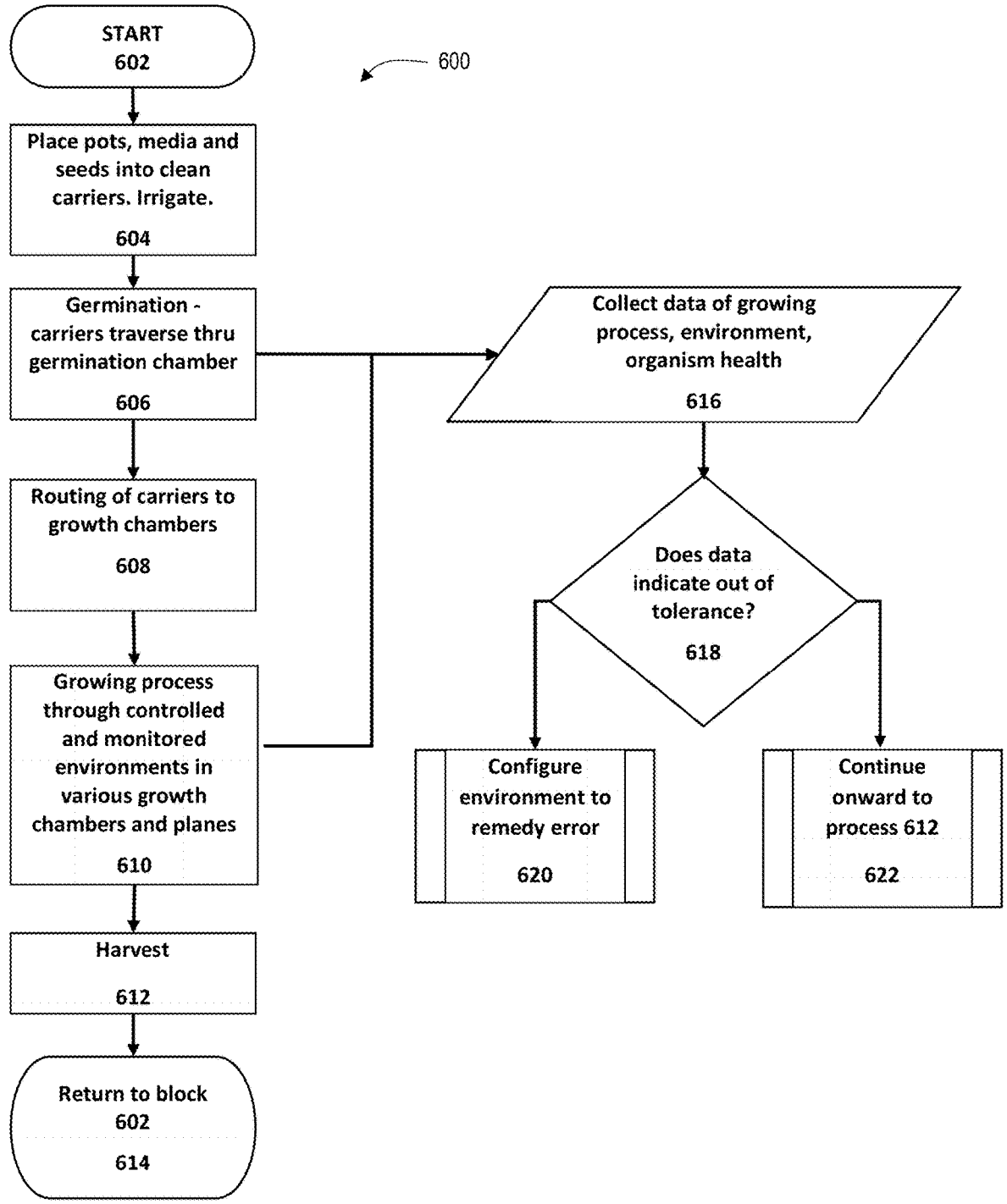
FIG. 6 shows a flowchart of a grow process, according to various aspects of the disclosure.

FIG. 6 shows a flowchart of a grow process 600, according to various aspects of the disclosure. The grow process starts at block 602.

At block 604, clean carriers, or trays are planted at the planting station 406. In the case of cultivars, media and seeds are prepared. Pots are filled with media then seeds and irrigation are delivered. Pots are positioned and automatically placed in the carrier, or tray. The carrier or tray is conveyed to a germination chamber.

At block 606, the germination chamber 410 is a closed, environmentally controlled chamber with speed gates at both ends to allow the elevators 408, 412 load/unload carriers 108 when called. Sensors and digital images capture and record the health profile of the organisms as they exit the germination chamber 410.

At block 608, once germination is complete, the carrier 108, or trays exit the germination chamber 410 upon a routing call. A routing call is a production plan signal that directs automation on what route a carrier 108 will take through which one of the multi-layer grow systems 401. The carrier 108 is conveyed directly to the lowest plane in the chosen multi-plane grow structure 401. If trays or other carrier system is used (for density during germination), plants from trays/carriers are transplanted to carriers at the transplanting station 416. When filled up with pots, sub-carriers, or cultures the carriers are moved forward to the lowest plane in the chosen one of the multi-plane grow structures 401.

At block 610, after entering the structure 401 at the lowest plane, the carriers proceed with pots, subcarriers or cultures to receive light, nutrition, and a favorable climate. Sensors 150 record the organism's health profile as they begin their production lifecycle and move forward through the first plane. The carriers are automatically moved forward and upwards in the structure to the second plane.

The growing process is continued with the serpentine growth path 102 in the production planes: 1st plane to 2nd plane, 2nd to 3rd; 3rd to 4th; 4th to 5th and so on. Other growth paths may be used, as described above.

At block 616, at each plane there exists a plurality of zones in which climate, light and fertigation sensors record the plant growing environment as it traverses across the plane.

At block 618, out of tolerance environmental, lighting or irrigation conditions are processed for course correction at one of the next zones or planes. Data processed may determine that color, height, colony coverage, leaf size, etc. are inadequate or out of tolerance.

At block 620 and block 622, climate control, grow light duration and intensity or Daily Light Integral (DLI), fertigation, air flow, $CO_2$ concentration may be scheduled with alterations as the plant or organism progresses to upper levels.

At block 612, in the harvesting and packaging center, completed carriers 108 are picked from the top layer by elevator 146 and delivered to the harvest area 148. The elevator 146 moves the carriers 108 to the right working height and leaves these in the harvest position for either manual or automated quality control and conveyance to processing or case packing.

At block 614, as the carriers 108 are harvested, the elevator 146 retrieves the next set of carriers 108 and is thus always ready with continuous flow.

When carriers 108 are harvested, they are immediately placed on a lower conveyance line 404 and transported to a connected wash and sterilization center 152 then queued for planting at the planting station 406.

All combined, the multi-plane hydroponic grow system with continuous flow design provides the foundation capability to maximize:

$$\text{high quality yield} = x/y,$$

$$\text{high plant or organism density} = y/z, \text{ and}$$

$$\text{rapid life cycle productivity} = x/t,$$

where x is the actual quantity of quality product sold through to customers measured in Kgs or saleable units per annum, y is the full quantity capacity capable of being produced by the system without defects measured in Kgs or units per annum, z is the total production and processing facility footprint (area) measured in square meters, and t=the period for which plant or organism growth is measured (day, week, month).

In addition to starting out with NFT, such as described in U.S. Pat. No. 4,163,342 by GE, the movement across and along each plane provides each plant with controlled and slight common cause variation in growing conditions throughout their day and night. This serves to make the plant more robust and healthier versus sitting under the same grow lights in the same position with the same exact temperature, nutrient blend and airflow cycles. Additionally, the length of the multi-plane system keeps all plants or organisms moving throughout their life cycle eliminating the opportunity for pests to nest further increasing overall yield.

In some embodiments, the system is a high density vertically connected multi-plane hydroponic grow structure utilizing artificial lighting that is vertically stacked greater than two levels with optimal organism growth height per level.

In some embodiments, the system is a connected multi-plane system for continuous production flow in a controlled agriculture environment to minimize labor.

In some embodiments, the system utilizes mixed cultivar production within the continuous production system to respond to consumer demands with automated mass-customization.

In some embodiments, the plants and/or organisms within the system are grown under variable indoor conditions. High speed conveyance throughout the life cycle ensures plants/ organisms receive variation of controlled environmental conditions with lighting, climate and irrigation making the growth more robust and eliminating any plant/organism defects that may occur in a stagnant controlled environment. Moreover, high speed conveyance eliminates the opportunity for pests to settle in and lay eggs.

In some embodiments, programmable real time crop or organism course correcting is enabled with multi-plane-controlled zones and microenvironments throughout their life cycle stages.

It should be appreciated that the logical operations described herein with respect to the various figures may be implemented (1) as a sequence of computer implemented acts or program modules (i.e., software) running on a computing device (e.g., the computing device described in FIG. 7), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Figure 7:
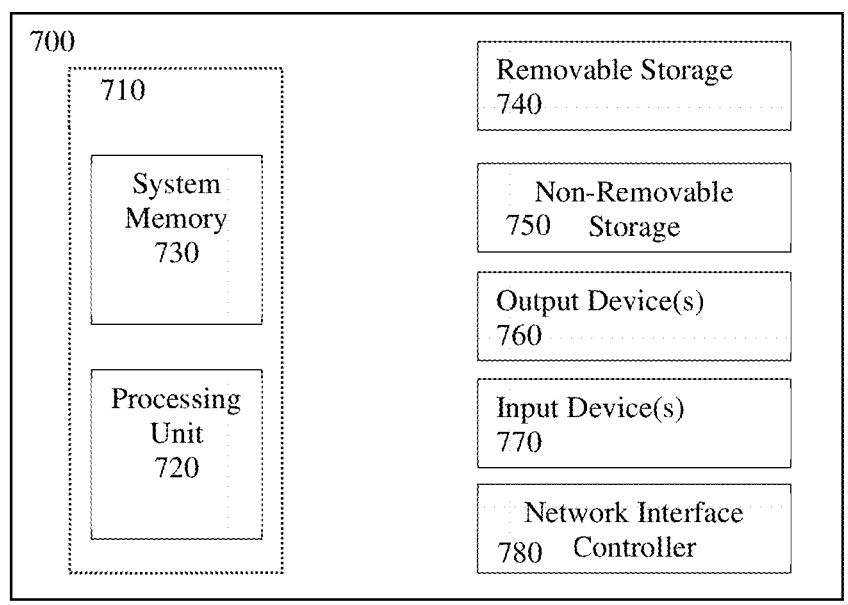
FIG. 7 illustrates an exemplary computer system suitable for implementing the several embodiments of the disclosure.

Referring to FIG. 7, an example computing device 700 upon which embodiments of the invention may be implemented is illustrated. For example, the controller 414 and the controller 500 may each be implemented as a computing device, such as computing device 700. It should be understood that the example computing device 700 is only one example of a suitable computing environment upon which embodiments of the invention may be implemented. Optionally, the computing device 700 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 700 to provide the functionality of a number of servers that is not directly bound to the number of computers in the computing device 700. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 700 typically includes at least one processing unit 720 and system memory 730. Depending on the exact configuration and type of computing device, system memory 730 may be volatile (such as random access memory (RAM)), non-volatile (such as read-only memory (ROM), flash memory, etc.), or some combination of the two. This most basic configuration is illustrated in FIG. 7 by dashed line 710. The processing unit 720 may be a standard programmable processor that performs arithmetic and logic operations necessary for operation of the computing device 700. While only one processing unit 720 is shown, multiple processors may be present. Thus, while instructions may be discussed as executed by a processor, the instructions may be executed simultaneously, serially, or otherwise executed by one or multiple processors. The computing device 700 may also include a bus or other communication mechanism for communicating information among various components of the computing device 700.

Computing device 700 may have additional features/functionality. For example, computing device 700 may include additional storage such as removable storage 740 and non-removable storage 750 including, but not limited to, magnetic or optical disks or tapes. Computing device 700 may also contain network connection(s) 780 that allow the device to communicate with other devices such as over the communication pathways described herein. The network connection(s) 780 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 700 may also have input device(s) 770 such as a keyboard, keypads, switches, dials, mice, track balls, touch screens, voice recognizers, card readers, paper tape readers, or other well-known input devices. Output device(s) 760 such as a printer, video monitors, liquid crystal displays (LCDs), touch screen displays, displays, speakers, etc. may also be included. The additional devices may be connected to the bus in order to facilitate communication of data among the components of the computing device 700. All these devices are well known in the art and need not be discussed at length here.

The processing unit 720 may be configured to execute program code encoded in tangible, computer-readable media. Tangible, computer-readable media refers to any media that is capable of providing data that causes the computing device 700 (i.e., a machine) to operate in a particular fashion. Various computer-readable media may be utilized to provide instructions to the processing unit 720 for execution. Example tangible, computer-readable media may include, but is not limited to, volatile media, non-volatile media, removable media, and non-removable media implemented in any method or technology for storage of information such as computer readable instructions, data structures, program modules or other data. System memory 730, removable storage 740, and non-removable storage 750 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 720 may execute program code stored in the system memory 730. For example, the bus may carry data to the system memory 730, from which the processing unit 720 receives and executes instructions. The data received by the system memory 730 may optionally be stored on the removable storage 740 or the non-removable storage 750 before or after execution by the processing unit 720.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether a term is elaborated or discussed herein. Synonyms for certain terms are provided. A recital of one or more synonyms does not exclude the use of other synonyms.

The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

EXAMPLES

1. A multi-plane hydroponic grow system, the system comprising:
 a carrier operable to receive pots with media and seeds, sub-carriers with media and organisms, or cultures;
 a germination chamber operable to house a portion of the carriers and further comprising:
  two ends, each end having a speed gate;
  a sensor module operable to detect out of tolerance environment conditions within the germination chamber;
 a first plane operable to receive the carrier, the first plane further comprising:
  a light module operable to adjust light within the first zone of the first plane;
  a nutrition module operable to provide nutrition to the cultivars, organisms or cultures within the carrier;
  a climate module operable to control the climate within the first zone of the first plane;
  a sensor module operable to detect out of tolerance conditions within the first zone of the first plane;
 a harvesting and packing center operable to select completed carriers from a plurality of carriers and deliver the completed carriers to a harvest area; and
 a conveyance system operable to receive carriers and transport the carriers from one end of a plane to the other;
 an elevator operable to receive carriers and transport the carriers between a plurality of vertical planes and a receiving or harvesting station; and
 a second conveyance system operable to transport carriers to a plurality of multi-plane hydroponic grow structures.

2. The multi-plane hydroponic grow system of example 1, wherein said system is a high-density system with more than two vertically stacked planes.

3. The multi-plane hydroponic grow system of example 1, wherein the first plane is the first plane among a plurality of planes, and wherein each plane of the plurality of planes is between 0.5 meters and 20 meters in width.

4. The multi-plane hydroponic grow system of example 1, wherein the first plane is the first plane among a plurality of planes, and wherein each plane of the plurality of planes is between 10 meters and 200 meters in length.

5. The multi-plane hydroponic grow system of example 1, wherein the carriers within any multi-plane hydroponic grow system are identical but in separate instances are configurable in width, height and top opening to accommodate a variety of pots, sub-carriers, cultures or other accommodations for optimum organism growth 6. The multi-plane hydroponic grow system of example 1, wherein the plurality of carriers form a continuous production flow.

7. The multi-plane hydroponic grow system of example 1, wherein an environment zone of a plurality of zones within each plane can be manually or automatically adjusted and differ across zones and from other planes.

8. The multi-plane hydroponic grow system of example 1, wherein the environment includes lighting, climate, $CO_2$ concentration, fertigation, air flow or any combination thereon.

9. The multi-plane hydroponic grow system of example 1, wherein the system includes a pest detector.

10. The multi-plane hydroponic grow system of example 1, wherein the first plane is the first plane among a plurality of planes, wherein the first zone is a first zone among a plurality of zones among a plurality of planes, wherein the sensor module is a first sensor module among a plurality of sensor modules, and wherein each zone among the plurality of zones further includes one sensor module from the plurality of sensor modules.

11. A computer-implemented method for autonomously managing a multi-plane hydroponic grow system, the method comprising:
   receiving pots or subcarriers filled with media and seeds or organisms;
   housing a portion of the carriers, wherein housing a first portion further comprises:
   causing movement of a first speed gate and a second speed gate, the first speed gate located at a first end of the germination chamber and the second speed gate location at a second end of the germination chamber;
   controlling the climate within the germination chamber;
   detecting out of environment tolerance conditions within the germination chamber;
   selecting carriers from the germination chamber, wherein selecting a carrier from the germination chamber further comprises:
   forecasting availability and lifecycle of cultivars and organisms ready for production;
   routing of carriers to the designated multi-plane hydroponics grow structure;
   receiving the carrier on a first plane, wherein receiving a carrier on the first plane further comprises:
   controlling the lighting within the first plane;
   controlling the nutrition to the pots or organisms;
   controlling the climate, CO2 concentration and air flow within the first zone of the first plane;
   detecting out of environment tolerance conditions within the first or successive zones and plane(s);
   delivering completed carriers to a harvest area, wherein delivering completed carriers include:
   selecting completed carriers with harvest-ready organisms from a plurality of carriers; and
   in response to delivering completed carriers, receiving harvested carriers and delivering the harvested carriers to the first plane.

12. The method of example 11, wherein detecting out of tolerance conditions further includes:
   adjusting an environment within the first or successive zones among plane(s) along the forward plant or organism life cycle path based on the detected out of tolerance conditions, wherein the environment includes lighting, climate, CO2 concentration, air flow, and fertigation.

13. The method of example 11, wherein the out of tolerance conditions can include pests, pest eggs, insufficient plant or organism height, insufficient leaf or colony size, incorrect leaf or organism color, insufficient fruit size, excessive humidity, temperature, light intensity, light duration, CO2 concentration, nutrient dosage, air flow or any combination of the above 14. The method of example 11, wherein the out of tolerance conditions are detected by a suite of sensors, wherein the suite of sensors includes a thermometer, thermal imager, camera, fertigation flow meter, hygrometer, air flow, ion, photometer, or any combination thereof.

15. The method of example 11, wherein delivering completed carriers to a harvest area further includes:
   washing harvested carriers;
   planting or establishing a new set of plants or organisms within the pots or subcarriers;
   transporting the new set of carriers to the germination chamber; and
   delivering the new set of plants or organisms to the multi-plane hydroponic grow system.

16. An electronic device comprising:
   a network interface for communication with components of a hydroponic grow system over a wireless communication channel;
   a processor; and
   a memory having instructions store thereon that, when executed by the processor, cause the processor to:
   delivering clean and empty carriers to a loading area, wherein delivering carriers includes the wash cycle and aggregation of empty carriers from a plurality of harvest areas;
   delivering carriers with harvest-ready mature organisms to a harvest area, wherein delivering harvest-ready carriers includes selecting completed carriers from a plurality of carriers;
   conveying carriers through the multi-plane hydroponic grow system receiving the carrier on a first plane, wherein receiving a carrier on the first plane further comprises:
   adjusting lighting within the first plane; providing nutrition to the pots, cultivars or organisms within the carrier;
   controlling the climate within the first zone of the first plane;
   detecting out of tolerance conditions within the first zone of the first plane;
   housing a portion of the carriers within the germination chamber, wherein housing a first portion further comprises:
   causing movement of a first speed gate and a second speed gate, the first speed gate located at a first end of the germination chamber and the second speed gate location at a second end of the germination chamber;
   controlling the climate within the germination chamber;
   detecting out of tolerance conditions within the germination chamber;
   receiving carriers of pots, subcarriers filled with media and seeds or other organisms.

17. The electronic device of example 16, wherein the first plane is the first plane in a system with more than two vertically stacked planes.

18. The electronic device of example 16, wherein the out of tolerance conditions can include pests, pest eggs, insufficient plant height, insufficient leaf, colony, root size, incorrect leaf or organism color, insufficient fruit size, excessive humidity, temperature, light intensity, light duration, CO2 concentration, nutrient dosage, air flow or any additional quality attribute or combination of the above.

19. The electronic device of example 16, wherein the plurality of carriers form a continuous production flow.

What is claimed is:
1. A multi-layer grow system, comprising:
   a first carrier path comprising a first conveyor configured to sequentially receive and convey a plurality of crop carriers along a length of the multi-layer grow system from a first end to a second end of the multi-layer grow system;
   a second carrier path comprising a second conveyor configured to sequentially receive and convey the plurality of crop carriers along the length of the multi-layer grow system from the second end to the first end of the multi-layer grow system, wherein the second carrier path is vertically displaced along a height at a next highest layer of the multi-layer grow system from the first carrier path;

a first elevator positioned at the second end of the multi-layer grow system and configured to sequentially receive the plurality of crop carriers from the first carrier path, vertically lift, and deliver each of the plurality of crop carriers to the second carrier path;

a third carrier path comprising a third conveyor configured to sequentially receive and convey the plurality of crop carriers along the length of the multi-layer grow system from the first end to the second end of the multi-layer grow system, wherein the third carrier path is vertically displaced along a height at a next highest layer of the multi-layer grow system from the second carrier path;

a second elevator positioned at the first end of the multi-layer grow system and configured to sequentially receive the plurality of crop carriers from the second carrier path, vertically lift, and deliver the carrier to the third carrier path, wherein sequential ones of the plurality of crop carriers are spaced apart on at least the second and third carrier paths; and air supply ducts and air return ducts that are arranged to promote vertical air flow from the first carrier path through the second and third carrier paths in spacing between sequential ones of the plurality of crop carriers, wherein the air supply ducts comprise:
  a main air supply duct that extends along the length of the multi-layer grow system;
  a plurality of supply plenums in fluid communication with the main air supply duct, the plurality of supply plenums extending along a height of the multi-layer grow system at a first set of predetermined locations along the length of the multi-layer grow system;
  each of the plurality of supply plenums in fluid communication with a respective plurality of layer supply ducts, each of the plurality of supply ducts extending along a width of the multi-layer grow system at a different layer of the multi-layer grow system; and wherein the air return ducts comprise:
  a main air return duct; and
  a plurality of lateral air return ducts in fluid communication with the main air return duct, the plurality of lateral air return ducts extending along the width at a second set of predetermine locations along the length of the multi-layer grow system;
  each of the plurality of lateral air return ducts comprises a plurality of air return registers spaced apart at predetermined distances across the width of the multi-layer grow system.

2. The multi-layer grow system of claim 1, further comprising:
a fourth carrier path configured to sequentially receive and convey the plurality of crop carriers along the length of the multi-layer grow system from the second end to the first end of the multi-layer grow system, wherein the fourth carrier path is vertically displaced along a height at a next highest layer of the multi-layer grow system from the third carrier path,
wherein the first elevator is configured to sequentially receive the plurality of crop carriers from the third carrier path, vertically lift, and deliver each of the plurality of crop carriers to the fourth carrier path, and wherein the second elevator is configured to sequentially receive the plurality of crop carriers from the fourth carrier path, vertically lower, and deliver each of the plurality of crop carriers to the first carrier path.

3. The multi-layer grow system of claim 1, wherein a spacing between sequential ones of the plurality of crop carriers is the same along the first, second, and third carrier paths.

4. The multi-layer grow system of claim 1, wherein a spacing between sequential ones of the plurality of crop carriers is different on different ones of the first, second, and third carrier paths.

5. The multi-layer grow system of claim 4, wherein the spacing between sequential ones of the plurality of crop carriers increases at each successive layer of the multi-layer grow system.

6. The multi-layer grow system of claim 4, wherein the spacing between sequential ones of the plurality of crop carriers is different at different cells along a respective one or more of the first, second, and third carrier paths.

7. The multi-layer grow system of claim 1, wherein the second conveyor is configured to convey the plurality of crop carriers along the length of the multi-layer grow system from the second end to the first end of the multi-layer grow system at a faster rate than the first conveyor is configured to convey the plurality of crop carriers along the length of the multi-layer grow system from the first end to the second end.

8. The multi-layer grow system of claim 7, wherein the third conveyor is configured to convey the plurality of crop carriers along the length of the multi-layer grow system from the first end to the second end of the multi-layer grow system at a faster rate than the second conveyor is configured to convey the plurality of crop carriers along the length of the multi-layer grow system from the second end to the first end.

9. The multi-layer grow system of claim 1, wherein each of the plurality of supply ducts comprises a plurality of air supply holes, wherein one or more of the plurality of air supply holes are on a top half of one or more of the plurality of supply ducts.

10. The multi-layer grow system of claim 1, wherein the second set of predetermined locations along the length of the multi-layer grow system are the same as the first set of predetermined locations along the length of the multi-layer grow system.

11. The multi-layer grow system of claim 1, further comprising:
an air conditioner configured to maintain a temperature, humidity, and carbon dioxide levels of air recirculated within the air supply ducts and air return ducts.

12. The multi-layer grow system of claim 11, wherein the air conditioner is configured to inject carbon dioxide to maintain an amount of carbon dioxide within air supplied to the air supply ducts between 400-5000 parts per million.

13. The multi-layer grow system of claim 1, wherein a width of the multi-layer grow system corresponds to a width of each of the plurality of crop carriers.

14. The multi-layer grow system of claim 13, wherein the width of the multi-layer grow system is greater than 8 feet, greater than or equal to 20 feet, or less than or equal to sixty feet, and wherein the length of the multi-layer grow system is greater than 20 feet, greater than or equal to 50 feet, or less than or equal to 600 feet.

15. The multi-layer grow system of claim 13, wherein each of the first, second, and third carrier paths of the multi-layer grow system is sloped across the width of the multi-layer grow system.

16. The multi-layer grow system of claim 15, wherein the slope is less than 5 degrees.

17. A multi-layer grow system, comprising:
a first carrier path comprising a first conveyor configured to sequentially receive and convey a plurality of crop carriers along a length of the multi-layer grow system from a first end to a second end of the multi-layer grow system;
a second carrier path comprising a second conveyor configured to sequentially receive and convey the plurality of crop carriers along the length of the multi-layer grow system from the second end to the first end of the multi-layer grow system, wherein the second carrier path is vertically displaced along a height of the multi-layer grow system from the first carrier path, and wherein a spacing between the plurality of crop carriers along the second carrier path is greater than a spacing between the plurality of crop carriers along the first carrier path;
a first elevator positioned at the second end of the multi-layer grow system and configured to sequentially receive the plurality of crop carriers from the first carrier path and vertically lift and deliver the carrier to the second carrier path; and
air supply ducts and air return ducts that are arranged to promote vertical air flow from the first carrier path through the second carrier path in spacing between sequential ones of the plurality of crop carriers, wherein the air return ducts comprise:
a main air return duct; and
a plurality of lateral air return ducts in fluid communication with the main air return duct, the plurality of lateral air return ducts extending across a width of the multi-layer grow system at a first set of predetermine locations along the length of the multi-layer grow system;
each of the plurality of lateral air return ducts comprises a plurality of air return registers spaced apart at predetermined distances across the width of the multi-layer grow system.

18. A multi-layer grow system, comprising:
a first carrier path comprising a first conveyor configured to sequentially receive and convey a plurality of crop carriers along a length of the multi-layer grow system from a first end to a second end of the multi-layer grow system;
a second carrier path comprising a second conveyor configured to sequentially receive and convey the plurality of crop carriers along the length of the multi-layer grow system from the second end to the first end of the multi-layer grow system, wherein the second carrier path is vertically displaced along a height at a next highest layer of the multi-layer grow system from the first carrier path;
a first elevator positioned at the second end of the multi-layer grow system and configured to sequentially receive the plurality of crop carriers from the first carrier path, vertically lift, and deliver each of the plurality of crop carriers to the second carrier path;
a third carrier path comprising a third conveyor configured to sequentially receive and convey the plurality of crop carriers along the length of the multi-layer grow system from the first end to the second end of the multi-layer grow system, wherein the third carrier path is vertically displaced along a height at a next highest layer of the multi-layer grow system from the second carrier path;
a second elevator positioned at the first end of the multi-layer grow system and configured to sequentially receive the plurality of crop carriers from the second carrier path, vertically lift, and deliver the carrier to the third carrier path,
wherein sequential ones of the plurality of crop carriers are spaced apart on at least the second and third carrier paths; and
air supply ducts and air return ducts that are arranged to promote vertical air flow from the first carrier path through the second and third carrier paths in spacing between sequential ones of the plurality of crop carriers,
wherein the air return ducts comprise:
a main air return duct; and
a plurality of lateral air return ducts in fluid communication with the main air return duct, the plurality of lateral air return ducts extending along the width at a second set of predetermine locations along the length of the multi-layer grow system;
each of the plurality of lateral air return ducts comprises a plurality of air return registers spaced apart at predetermined distances across the width of the multi-layer grow system.

* * * * *